US006195681B1

(12) United States Patent
Appleman et al.

(10) Patent No.: US 6,195,681 B1
(45) Date of Patent: Feb. 27, 2001

(54) GUIDE-BASED INTERNET DIRECTORY SYSTEM AND METHOD

(75) Inventors: Kenneth H. Appleman, Brewster; Elizabeth A. Maier, Yorktown Heights; Scott C. Germaise, Valley Cottage, all of NY (US); William Day, Haworth, NJ (US); Jim Anderson, Wappinger's Falls, NY (US); Olga Taller, Hartsdale, NY (US); Scott Philip Kurnit, New York, NY (US)

(73) Assignee: About.Com, Inc., New York, NY (US)

( * ) Notice: Subject to any disclaimer, the term of this patent is extended or adjusted under 35 U.S.C. 154(b) by 0 days.

(21) Appl. No.: 09/129,843

(22) Filed: Aug. 6, 1998

Related U.S. Application Data

(63) Continuation of application No. 09/019,924, filed on Feb. 6, 1998, now Pat. No. 5,918,010.
(60) Provisional application No. 60/037,852, filed on Feb. 7, 1997.

(51) Int. Cl.[7] .................................................. G06F 13/00
(52) U.S. Cl. ............................................................ 709/203
(58) Field of Search .................................... 709/200, 203

(56) References Cited

U.S. PATENT DOCUMENTS

| 5,019,961 | 5/1991 | Addesso et al. ...................... 700/87 |
| 5,088,052 | 2/1992 | Spielman et al. .................... 345/346 |
| 5,347,632 | 9/1994 | Filepp et al. ......................... 709/202 |
| 5,361,393 | 11/1994 | Rossillo .................................. 713/1 |
| 5,442,771 | 8/1995 | Filepp et al. ......................... 709/219 |
| 5,572,643 | 11/1996 | Judson ................................ 709/218 |

FOREIGN PATENT DOCUMENTS 9802087   2/1998  (WO) .

OTHER PUBLICATIONS

Kurnit's Startup: Mining for Ad Deals and Intrigue, by Robert Silverman, dated Feb. 12–25, 1997.
Berners–Lee, T., et al.; "Hypertext Transfer Protocol—HTTP/1.0;" *University of California, Irvine*; http;//www.ics.uci.edu/pub/ietf/http/rfc1945.html; May 1996.
Burke, J.; "Web Databases with Cold Fusion 3;" *McGraw–Hill*; 1997.
Dallas, A.; "Using Collabra Share 2;" *McGraw–Hill*; 1997.
Graves, S.; "FrontPage 97 Web Sites," *The Coriolis Group, Inc.*; 1997.
"HTML;" w3, http://www.w3.org/History/19921103 . . . t/hypertext/WWW/MarkUp/MarkUp.html. undated.
"HTML Quick Reference;" *The University of Kansas*; http://www.cc.ukans.edu/~acs/docs/other/HTML_quick,shtml, undated.
"HTML Reference Manual;" *Sandia National Laboratories*, http://www.sandia.gov/sci_compute/html_ref.html; Jan 2, 1996.
Miller, K., et al., "Inside Microsoft Visual InterDev;" *Microsoft Press*; 1997.

*Primary Examiner*—Robert B. Harrell
(74) *Attorney, Agent, or Firm*—Hunton & Williams

(57) ABSTRACT

A collaborative Internet data mining system for facilitating a group effort from a plurality of guides to the Internet, by automatically processing the information provided by the guides and thereby create a branded or uniform look and feel to the web sites supported by the plurality of guides.

54 Claims, 29 Drawing Sheets

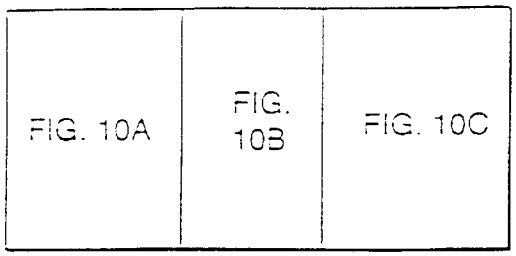

FIG. 10

[1] START WITH GUIDE TEMPLATE  850

```
<HTML>
<HEAD>
  <TITLE>Affilale-Created-</TITLE>
  <META>Affil.creates_keywork<META>
  <META>Affil.creates_dither<META>
  <SCRAP>Affil.optionally creates Java???<SCRAP>
<HEAD>

<BODY>      Affiliate's "Live Content Are"
   (although there is a default format here, this section is
  wholly editable by them and dependent upon compliance
  with documentation.  Further, any design elements placed
  here are not easily updateable by GI and they depending
    on editing of the "Live Content Area"- Athough there
     Will be some places where we insert content into this
                         area.)

</BODY>
</HTML>
```

TO FIG. 10B

CHEWYSAYS:
GO OVER TO HERE  856

852

[2] RUNS AGAINST CHEW PROCESS

CHEWY PROCESS

"TELLS" DOCUMENT WHERE
TO GET DESIGN INFORMATION
AND WHERE TO INSERT IT IN
THE TEMPLATE

[4]SERVER SERVES UP BROWSER-READABLE HTML
VIA CODE, HTML, & SERVER SIDE INCLUDES. (USER DOES
NOT SEE SERVER SIDE INCLUDES: ONLY END OUTPUT

```
<HTML>
<HEAD>
    <TITLE>Affiliate-Created</TITLE>
    <META>Affil. creates... keyword</META>
    <META>Affil. creates... other???</META>
    <SCRIPT>Affil. optionally creates JavaScript</SCRIPT>
    <!-GIHEDSTRT->
    <METANAME="zgitemplate"CONTENT="5.4">
    <!-#include virtual="navigation stuff, etc."..>
<HEAD>

<BODY BLAH BLAH>
<TABLE>
  <TR><more html><ING SRC="BLAH">
  <A HREF="hjdstuekdjf;"jakjsdf></A>
  <1-GIMCHITERM..>

Affiliate's "Live Content Are"
  (although there is a desired format here, this section is wholly
        editable by them and dependent upon compliance with
  documentation. Further, any design elements placed here are not
  easilly updateable by GI as they depending on editing all the "Live
    Content Area" - Although there WILL be some pieces where we
                     insert content into this area.)

<!-GIMCLOSIRT->
  </TABLE>
   <TR><more html><IMG SRC="BLAH">
   <A HREF="kjd;askdjf;"jakjsdf></A>
  <!-GIMCLOTERM-->
  </BODY>
  </HTML>
```

872

FROM
FIG. 10B

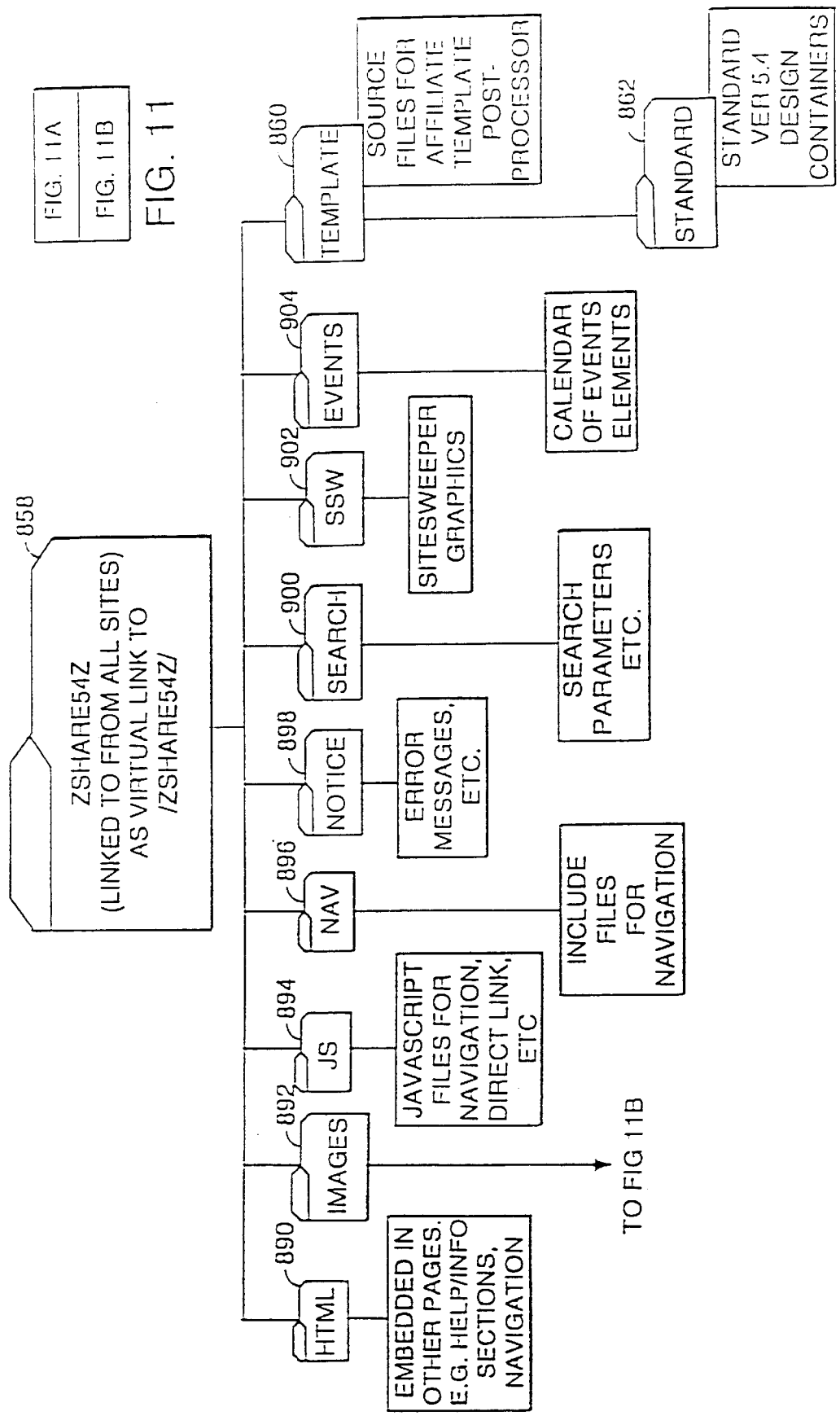

| | |
|---|---|
| Site Management: Add a Site | |
| Hub: | ARTS/ENTERTAINMENT —1018 |
| Section Name: | Music —1020 |
| Exact Site Name: | —1022 |
| Character Site ID: | —1024 |
| Site Nave.Name: | —1026 |
| Live: | Y ⊙ N ⊙ <br> I ⊙ X ⊙ <br> A ⊙ —1028 |
| Newsletter: | YES ⊙ NO ⊙ —1030 |
| Chat: | YES ⊙ NO ⊙ —1032 |
| Boards: | YES ⊙ NO ⊙ —1034 |
| Classified Ads: | YES ⊙ NO ⊙ —1036 |
| Disclaimers: | Legal ⊙ <br> Medical ⊙ <br> Financial ⊙ <br> Official Game ⊙ —1038 |
| Copyright: | YES ⊙ NO ⊙ —1040 |
| 1042— [Submit Query] [Reset] —1044 | |

| | | |
|---|---|---|
| Site Management: Modify Site | | |
| Hub: | CAREERS/EDUCATION | —1048 |
| Section Name: | Education | —1050 |
| Exact Site Name: | Art Education | —1052 |
| Character Site ID: | Art Education | —1054 |
| Site Nav. Name: | Art Education | —1056 |
| Live: | Y ⊙ N ⊙<br>1 ⊙ X ⊙<br>A ⊙ | —1058 |
| Newsletter: | YES ⊙ NO ⊙ | —1060 |
| Chat: | YES ⊙ NO ⊙ | —1062 |
| Boards: | YES ⊙ NO ⊙ | —1064 |
| Classified Ads: | YES ⊙ NO ⊙ | —1066 |
| Disclaimers: | LEGAL ⊙<br>MEDICAL ⊙<br>FINANCIAL ⊙<br>OFFICIAL GAME ⊙ | —1068 |
| Copyright: | YES ⊙ NO ⊙ | —1070 |
| Citibank: | YES ⊙ NO ⊙ | —1072 |
| Business Listings: | YES ⊙ NO ⊙ | —1074 |

1076—[Submit Query]  [Reset]—1078

Guide Management: Add Application

"Air Travel" (#1234) Site Application — 1082

Fields appearing in red are the minimum required fields.

| | |
|---|---|
| User Name: | domain_nyc\otaller — 1084 |
| Current Date: | 2/3/98 — 1086 |
| Title: | Mr. ⌐  Mrs. ⌐  Miss. ⌐  Dr. ⌐ — 1088 |
| First Name: | [_____] — 1090 |
| Last Name: | [_____] — 1092 |
| Legal First Name: | [_____] — 1094 |
| Legal Last Name: | [_____] — 1096 |
| Email Address: | [_____] — 1098 |
| Secondary Email Address: | [_____] — 1100 |
| Address (line 1): | [_____] — 1102 |
| Address(line 2): | [_____] — 1104 |
| City: | [_____] — 1106 |
| State/Province/Region: | [_____] — 1108 |
| Zip Code: 1110 — [_____] Country: [USA_____] — 1112 |
| Phone Number: | [_____] — 1114 |
| Operating System: | [Win 95 ▼] — 1116 |
| Application Received: | [2/3/98] — 1118 |
| Application Accepted: | [_____] — 1120 |
| Application Rejected: | [_____]  Status: [Rejected ▼] — 1124 |
| Referred By: | [Acquisitions ▼] — 1126 |
|  | 1122 |
| Referrer Name: | [_____] — 1128 |
| General Comments: | [_____] 1130 |

1132 — [Submit]   [Reset] — 1134

FIG. 13D

Guide Management: Add Application

Ian 666 Application Modification

*Fields appearing in red are the minimum required fields.*

| | |
|---|---|
| User Name: | domain_nyc\otaller |
| Current Date: | 2/3/98 |
| Title: | Mr. ○ Mrs. ○ Miss. ○ Dr. ○ |
| First Name: | Ian |
| Last Name: | 666 |
| Legal First Name: | Ian |
| Legal Last Name: | 666 |
| Email Address: | ops@miningco.com |
| Secondary Email Address: | |
| Address (line 1): | Ops |
| Address(line2): | |
| City: | New York |
| State/Province/Region: | NY |
| Zip Code: | 10017    Country: |
| Phone Number: | |
| Tax ID(SSN): | |
| Operating System: | ▼ |
| Referred By: | ▼ |
| Referrer Name: | |

[ Submit ] [ Reset ]

FIG. 13E

Guide Management: GI Account Modification

| | |
|---|---|
| GI Number: | — 1160 |
| User Name: | domain_nyc\otaller — 1162 |
| Current Date: | 2/3/98 — 1164 |
| Site Name: | Computer Industry — 1165 |
| Title: | Mr. ⦿  Mrs. ◯  Miss. ◯  Dr. ◯ — 1166 |
| First Name: | [John] — 1168 |
| Last Name: | [San Filippo] — 1170 |
| Email Address: | [johnsf@info-wave.com] — 1172 |
| Secondary Email Address: | [ ] — 1174 |
| Phone: | [ ] — 1176 |
| Class Name: | Neon - Diana — 1178 |
| Class Mentor: | Diana Tirado — 1180 |
| Peer Mentor: | — 1181 |
| Due Date: | [2/9/98] — 1182 |
| Review Date: | [2/19/98] — 1184 |
| Active Date: | [ ] — 1186 |
| Graduation Date: | [ ] — 1188 |
| Termination Date: | [ ] — 1190 |
| Termination Reason: | [ ▼] — 1192 |
| AE Status: | [ ▼] — 1194 |
| Hold Reasons: | [ ▼] — 1194 |
| Final QC Date: | [ ] — 1198 |
| Final Edit Date: | [ ] — 1200 |
| Final Review Date: | [ ] — 1202 |
| Hold Date: | [ ] — 1204 |
| Promotion Date: | [ ] — 1206 |
| Contract Out: | — 1208 |
| Contract Back: | — 1210 |
| Photograph: | YES ◯  NO ⦿ — 1212 |
| Navigation: | YES ◯  NO ⦿ — 1214 |
| Art: | YES ◯  NO ⦿ — 1216 |

Guide Management: AE Graduations

| | |
|---|---|
| GI Number: | 33 |
| User Name: | domain_nyc\otaller |
| Current Date: | 2/3/98 |
| Site Name: | Auto Repair |
| Title: | Mr. |
| First Name: | Andrew |
| Last Name: | Roe |
| Email Address: | aroe@ix.netcom.com |
| Secondary Email Address: | None |
| Class Name: | Beryl - Diana |
| Class Mentor: | Diana Tirado |
| Peer Mentor: | |
| Due Date: | 1/12/98 |
| Review Date: | 1/22/98 |
| Active Date: | 1/12/98 |
| Graduation Date: | |
| Termination Date: | |
| AE Status: | Pass |
| Hold Reasons: | Technical(E)  —1232 |
| Final QC Date: | |
| Hold Date: | 2/5/98 |
| Mentor Comments: | 1/29/98-DT<br>Guide has not made any of the requested changes as of yet. I have heard nothing from Andrew for the past week, yet today he finally wrote back to me. He claims that his computer crashed over the weekend and he lost some of his |

1334

1228—[ Submit ]  [ Reset ]—1230

FIG. 131

|   |   |
|---|---|
| | Guide Management: Contracts |
| GI ID: | 2522 —1342 |
| User Name: | domain_nyc\otaller —1344 |
| Current Date: | 2/3/98 —1346 |
| First Name: | [Sara] —1348 |
| Last Name: | [666] —1350 |
| Legal First Name: | [Sara] —1352 |
| Legal Last Name: | [666] —1354 |
| Email Address: | [ops@miningco.com] —1356 |
| Second Email: | [ ] —1358 |
| Exact Site Name: | Genetics —1360 |
| Application Received: | 1/1/80 —1362 |
| Contract Number: | [ ] —1364 |
| Assoc. Agree Out: | YES ○ NO ⦿ —1366 |
| Assoc. Agree Back: | YES ○ NO ⦿ —1368 |
| Contract Out: | [ ] —1370 |
| Contract Back: | [ ] —1372 |
| License: | [ ] —1374 |
| Payment Amount: | [0] —1376 |
| Contract Addendum: | [ ] —1378 |
| General Comments: | [ ] —1380 |
| MC Termination Date: | [11/24/97] —1382 |
| MC Termination Reason: | [▼] —1384 |
| | 1386—[Submit]  [Reset]—1388 |

FIG. 13J

GUIDE-BASED INTERNET DIRECTORY SYSTEM AND METHOD

This patent application seeks priority from Provisional Patent Application Ser. No. 60/037,852, filed Feb. 7, 1997, and U.S. patent application Ser. No. 09/019,924, now U.S. Pat. No. 5,918,010, filed Feb. 6, 1998, all of which are incorporated herein by reference in their entirety.

BACKGROUND OF THE INVENTION

The 1990's have been remarkable for the explosive growth of the Internet from an specialized system used by academia to a widespread medium for the transfer of information and electronic commerce.

The "Internet" was developed in the 1970's with funding from the Department of Defense to interconnect university computer systems. Until recently, Internet usage was largely confined to academic circles to send e-mail, chat and access remote files and computer resources. The Internet application programs to perform e-mail, chat and the remote access of data were, in large part, command intensive and did not provide an easy to use graphical user interface.

The explosive growth of the Internet has been fueled, in large part, by the development and wide adoption of the HyperText Transfer Protocol (HTTP). HTTP is the Internet protocol used to transfer documents and other Multipurpose Internet Mail Extensions (MIME) type data between systems. HTTP is the protocol on which the World Wide Web ("the web") is based. To the Internet user, the web is an easy to use graphical user interface that provides "point-and-click" access to data from an enormous number of remote computers.

The communication technology of the web can be explained by analogy to the Open System Interconnect Model (OSI) for computer communication. HTTP resides above the Transport Control Protocol/Internet Protocol (TCP/IP) layers and provides a transfer protocol between the web server and the browser client. TCP/IP divides networking functionality into only four layers: (1) a network interface layer that corresponds to the OSI link layer, (2) an Internet layer which corresponds to the OSI network layer (3) a transport layer which corresponds to the OSI transport layer and (4) an application layer which corresponds to the session, presentation and application layers of the OSI model. The web browser (client) may correspond to the application layer of the OSI model and Hyper-Text Markup Language may correspond to the presentation layer.

The Hyper-Text Markup Language (HTML) is the software language in which most of the web is written. HTML is basically ASCII text surrounded by HTML commands in angled brackets. HTML commands are interpreted by a web browser to determine how to display a web page.

The web, as a whole, is made up of web page servers and web browsers that provide a hardware and operating system independent environment. A web browser is an application program that interprets and displays HTML pages. The web is hardware and operating system independent because of the common HTTP and HTML protocols and languages used between the web servers and the browser client applications.

HTML web pages usually contain links or HyperText that point to other HTML pages on the web. By pointing and clicking on these links, a user can skip or "surf" from page to page on the web.

A primary function of a web browser is to display the page located at an Universal Resource Location (URL) address. A URL is an address that includes the protocol to reference the data, the system path and data filename. The data file addressed by the URL data filename is located on a server.

One aspect of the way in which HTML supports the display of data is through the support of "frames." Frame support can be defined as the ability of a web browser to split the browser display area into separate "framed" display areas. Each display area, or frame, can contain information from a separate web page and/or point to a separate URL address. Frames can be created to present the user with a simultaneous coordinated presentation of multiple frames while maintaining the look-and-feel of a single web page.

Another feature in most web browsers is the ability to "bookmark" a page. Typically, the web browser stores a plurality of bookmarked pages in a non-volatile storage mechanism where they may be retrieved when the browser is reactivated. A bookmark is a reference to a single URL address.

The use of bookmarks presents a problem for web pages that are designed for display as multiple coordinated, or framed, web pages. A bookmark is a reference to a single URL address. A frame based web page, however, simultaneously displays multiple URL addressed web pages. Therefore, a bookmark created when viewing a frame based web page stores only one URL address, where multiple URL addresses are required to properly display the frame based data. When the user attempts to re-access the page with the bookmark, the browser display will only load one frame, which provides only part of the coordinated framed presentation of data.

Another service found on the web is the ability to search for information. Search services such as Yahoo™, Excite™, Lycos™, Infoseek™ and Hotbot™ provide a means for searching web pages and other information on the Internet that return references to URL address of web pages and other data that satisfy the search criteria. For the most part, these search services use a keyword search to find web pages and other information that satisfies the search request.

The web has created a forum that provides a very low cost way to publish information, views and opinion. This inexpensive way to publish information has resulted in an explosion in the amount of data available on the web. Ironically, the success of the web has created its own problems, namely how to separate informed views and authoritative information from uninformed views and unreliable information. The present invention addresses this problem by providing useful, novel and non-obvious methods and apparatus to point to and find quality information available on the Internet.

SUMMARY OF THE INVENTION

The present invention provides methods and apparatus for managing, implementing and creating a collaborative Internet data mining system. The collaborative data mining system is comprised of many human "guides" that maintain web sites on their respective topic areas. The guides may use conventional search services, their own knowledge and judgment and their knowledge of where information may be found on the Internet to construct high quality and authoritative web pages. The collaborative data mining system uses automated methods and apparatus to process the web pages created by the guides. The processing automatically "brands" the web pages by inserting uniform characteristics and information into the pages. The system may then sell advertising on the branded network and remunerate the guides based on predetermined criteria.

More specifically, the collaborative data mining system is accomplished through a unique computer based methodology for (1) selecting, training and policing Internet guides for predetermined topic areas, (2) processing pre-determined forms, formats and commands to create co-branded web pages that provide a coordinated look and feel across many web pages and (3) an automated revenue distribution system for compensating guides based on a predetermined performance measurements.

One aspect of the present invention provides an automated system for use in conjunction with a pre-determined form or template based methodology to generate web pages that automatically maintain the simultaneous and coordinated presentation of framed based data.

Another aspect of the present invention is the use of server side includes to replace "hard coded" HTML with references to "library" objects thereby increasing efficiency of the coding process, page loading, and the propagation of changes to web pages.

Another aspect of the present invention is the creation of novel procedures, system templates, scoring methods, and support tools to identify and solicit quality web producers and web artists to affiliate themselves with present invention's branded Internet server.

Another aspect of the present invention is the use of an automated system for designating and managing a plurality of guides in training.

Yet, another aspect of the present invention is in a mass mentoring system in which to improve and develop large numbers of guides and potential guides to improve their sites and meet the standards required to be a guide.

Yet, another aspect of the present invention is providing a novel, economical and expeditious way in which to maintain the highest possible level of quality and compliance across a high volume network while maintaining low cost and efficiency in developing and manufacturing information "content."

BRIEF DESCRIPTION OF THE FIGURES

FIGS. 10, 10A, 10B, and 10C shows a detailed diagram of the "CHEWY" process and how it is used to change the guide template to a server ready HTML page.

FIGS. 11, 11A, and 11B provides a detailed diagram of the logical file structure arrangement of the "zshare54z" shared directory structure.

FIGS. 12, 12A, and 12B shows a logical diagram of the directory structure for a guide site.

FIG. 13B provides a detailed diagram of a control screen used to add a new web site to the taxonomy of a collaborative Internet data mining system.

FIG. 13C provides a detailed diagram of a control screen used to modify a web site, that is maintained or used with the collaborative data mining system.

FIG. 13D provides a detailed diagram of a control screen used to add an application to the training system.

FIG. 13E provides a detailed diagram of a control screen used to modify an application in the system.

FIG. 13G provides a detailed diagram of a control screen that may be used to modify account information.

FIG. 13H provides a detailed diagram of additional fields for the control screen provided in FIG. 13G.

FIG. 13I provides a detailed diagram of a control screen that may be used to keep track and/or control part of the mentoring program.

FIG. 13J provides a detailed diagram of a control screen that may be used to control and/or track contract information.

DETAILED DESCRIPTION

One aspect of the present invention provides a means for providing a "brand name" look and feel to a plurality of web pages by using frames to provide a consistent banner across the pages that reside on the network regardless of how a user "surfs" into the network. This aspect of the present invention provides a brand look and feel to the network while maintaining the ability to randomly surf to a web page of interest.

Figure 1:
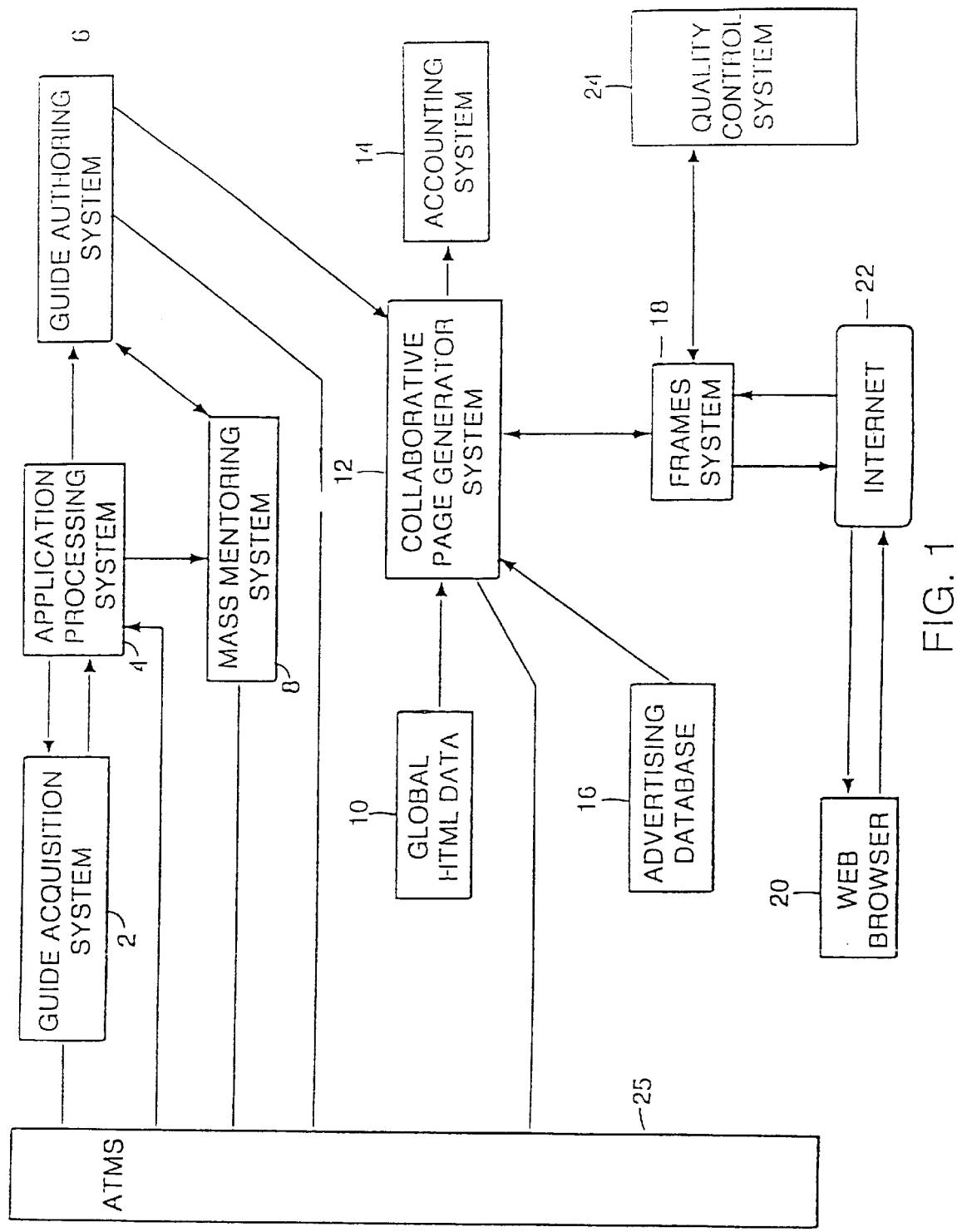
FIG. 1 shows a block diagram of the collaborative Internet invention as having a guide acquisition system (2) an application processing system (4), a guide authoring system (6), a mass mentoring system (8), the global HTML data bank ( 10), a collaborative page generator system (12), an accounting system (14) and advertising database system (16), the frames system (18), the Internet in general, as denoted by reference (22), a quality control process (24), an automated training and management system (25) and at least one web browser (20).

FIG. 1 provides an overview of the system elements of the collaborative data mining system. The present invention achieves its co-branded look and feel through the use of the guide authoring system (6), in conjunction with the collaborative page generator system (12) and the frames system (18). The guide authoring system (6) provides a guide with predetermined templates that are developed in conjunction with the global HTML data (10) and the frames system (18). The templates are developed by creating a finished web page and then removing the global brand elements and replacing them with "include" comments. The remaining page, with global sections replaced with the "include" comments and section blocked off for the guide to insert content form the basis for a HTML template.

Another aspect of the present invention is its ability to locate a very large number of Internet savvy guides in a short period of time through the guide acquisition system (2). The guide acquisition system is represented as block 2 in FIG. 1 and works in conjunction with the application processing system (4), the guide authoring system (6), the mass mentoring system (8) and the Automated Training and Management System or Affiliate and Taxonomy Management System (ATMS) (7). As provided above, guides may be contractors responsible for the content on specific topic areas on the present invention's web sites. The guide acquisition system (2) may, under direction, contact Internet "surfers" who may be connected to the Internet. An "Internet surfer" is a person or entity that is very familiar with content available on the Internet. The present invention provides an Internet surfer with a framework for searching the Internet, e.g., topics to search and a detailed set of instructions with the specifics of how to find quality sites on the web.

The present invention may use a set of standard measurements that indicate the likelihood that a site has the qualities that will result in a worthwhile contact for the application processing system (4). The surfers may send the guide acquisition system (2) screen captures of their search results. The screen captures may be evaluated based on predetermined quality criteria standards.

The application processing system (4) may generate a form e-mail to guide candidates inviting them to work with the collaborative data mining system. Candidates who express an interest may be directed to the application processing system (4) where they may begin the application process.

The application processing system (4) may efficiently convert a large number of applications from its outbound guide acquisition system (2) or inbound marketing recruitment. Using conventional labor intensive methods to review these applicants may not be cost efficient and indeed may be cost prohibitive for the processing volume required by a collaborative data mining system. Applicants may be required to download, complete and submit a template application. The application may require the submission of individual creative content, a detailed curricula vitae of the applicant, and answers to many questions about their particular interest, background, software, equipment and the like. The application may be designed to identify and isolate the qualities essential to a guide. The completed applications may be downloaded, entered into a database, and screened by entry level personnel through the use of standardized criteria.

Another aspect of the present invention is the mass mentoring system (8). The mass mentoring system (8) may use a small team of individuals to coach and coordinate the mentoring process for large volumes of guides and guide trainees identified and screened by application processing system (4). One-to-one development and training may be inefficient given the number of affiliates or guides needed by a reasonably sized collaborative data mining system. The mass mentoring system (8) may employ a training process, discussed further below, which may last up to three weeks. During the training process the present invention may send out predetermined e-mails to the guides covering specific topics key to their development. These e-mails may be specifically tailored to address the typical growth curve and problems of a "proto-guide."

The mass mentoring system may establish a project schedule for training guides on the collaborative data mining system. The mass mentoring system (8) may identify weekly milestones for the process and assign tasks the guides-in-training should try to accomplish in the first week. The mass mentoring system may also schedule the guides for group chat sessions to discuss their questions and issues. The mass mentoring system may also establish on-line bulletin boards to post questions to the staff at the mass mentoring system or to read the questions and answers of other guide trainees.

Once a guide is accepted for training they may be considered "affiliates" with the collaborative data mining system. The affiliates may be grouped in classes and the progress of the affiliates inside the class may be compared to others inside the class and to standards developed from prior classes. The classes give a means of peer support and may reduce the need for staff guidance.

The facilitated communication may result in guides solving the problems of guides. The mass monitoring system (8) may also assign an experienced guide to each class to act as a peer mentor and give advice and/or guidance to the guides-in-training. Through this novel process, the present invention may mentor up to a couple of hundred guides-in-training with a staff of small mentors, which may provide an economical way to train many guides.

Another aspect of the present invention is the quality control process (24). The present invention employs methods and systems to identify, screen, and develop guides for its Internet service. One key to establishing and keeping its consumer brand image for the present invention's network of guides is maintaining high quality standards across the many, many sites of the network. It may be cost prohibitive to rely on brute force methods of one-to-one inspection and review of individual sites. To wit, the present invention may use new approaches to the quality control (QC) process. First, it may use methods and programming code to make daily automated checks for bad links, breaks in standard template requirements, file download size, and organizational structure of a site. Second, it may use a standardized checklist to check for quality issues such as proper grammar, required site maintenance, timeliness of content, depth of contextual links and other criteria. The guide may receive a standardized e-mail "report card" with feedback on their site as well as specific tips for site enhancement.

Another aspect of the present invention is the frames system (18). The frames system (18) may provide a means for verifying that frame based data, or data that is formatted for presentation in framed format, is in fact loaded with the appropriate coordinated frame of data.

The frame system (18) also assures that the appropriate frame set for the designated topic is loaded. The data mining system of the present invention organizes data into topic areas such as, for example, health and business. Each topic area may have sub-topics. Each topic may have multiple pages (a "page set") contained inside a frame set. Each page may have a unique URL. Someone desiring to link to a page in the page set other than the first page in the set, e.g., the topic home page, would normally use that page's URL for the link. However, a link to a page other than the topic home page may not load the frame set correctly. Accordingly, the page may not be viewable as intended and could result in frame sets inside a frame set or no frame set at all. The frame system (18) provides a means for assuring that the systems frame based data is properly loaded with the appropriate frame or frames.

Another aspect of the present invention is the collaborative HTML processing and collaborative HTML page generator system (12). The data mining system of the present invention may require a clear navigation system across multiple interest areas and related topics. The system architecture is, therefore, reasonably flat with many similarly designed pages existing at the same level. In its simplest form, the "taxonomy" of the network consists of one home area (layer 1) leading down to thirteen plus or minus interest areas (layer 2) leading down to thousands of topics (layer 3). Each layer may share certain elements of a characteristic design across areas and topics. However, there are other elements that may vary depending on layer or topic. The time and cost to hard code each of these elements during creation or modification may be cost prohibitive and stifle the creative vision of the network. The collaborative page generator system (12) provides a means for processing data input from the guide network to produce complete HTML documents for use with the live network.

A final aspect of the present invention is the automated training management system or Affiliate and Taxonomy Management System (ATMS) (7) that provides a means for automatically tracking and managing the assets on the data mining network. The ATMS provides a report on the progress of each guide in training as well as providing a means for designating which web pages and topic areas are ready for the "live" network.

The Production Process

Figure 9:
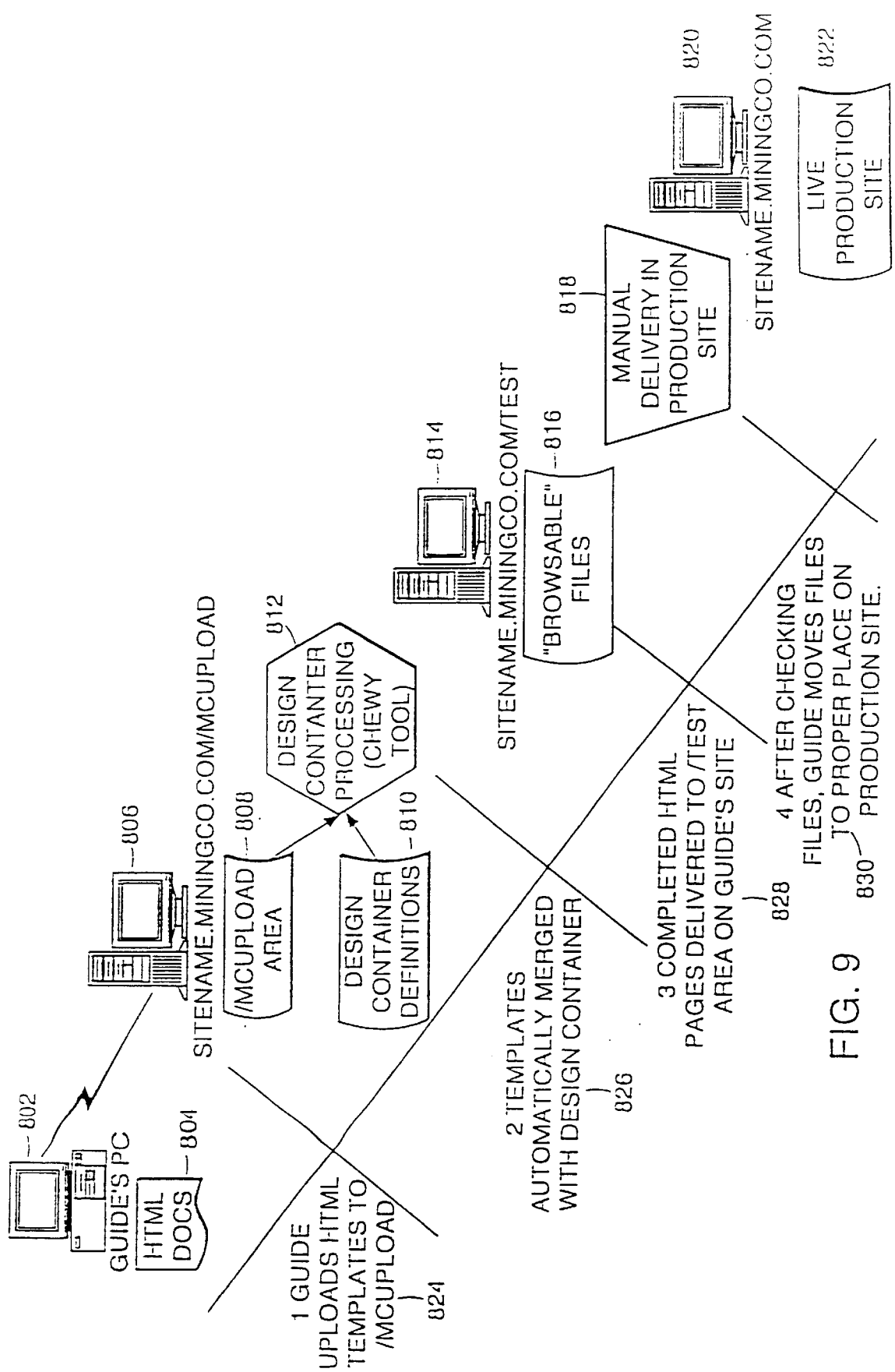
FIG. 9 shows the steps in the template production system starting from the guide's personal computer, through the processing steps and finally to the live production site.

The network production process is shown in FIG. 9. A guide who is trained to use the template system (discussed further below) creates HTML documents (804) for her topic area on her personal computer (802). The guide may upload the template based HTML documents to a directory called "/mcupload" (824) on a server computer (806). The uploading of files may be accomplished with the file transfer protocol (FTP) or other conventional methods for transferring data files.

The design container processing tool or "CHEWY" process (812) may be a Windows NT service, a UNIX deamon, or similar computer program that is designed to continuously execute or periodically poll the /mcupload directory or equivalent directory (808). When the CHEWY process (812) finds a file in the /mcupload directory the CHEWY process may open the document and processes the commands contained in the file, described further below, in conjunction with the container definitions (810) to generate "completed HTML" pages. The CHEWY process may then output the completed HTML pages to a "test" directory (814). It is understood that the "test" directory may be any directory that is accessible or able to be viewed on the guide's browsers (816). The guide may then access the complete HTML files to verify that the CHEWY process accurately parsed and processed the HTML template documents (804).

If the guide finds a problem in the completed HTML files, the guide may attempt to repair the completed HTML documents (816) or correct the template HTML documents (804) and re-submit the documents to CHEWY through the /mcupload (808) directory. Once the guide is satisfied with the completed HTML documents, the guide may transfer the HTML documents to the production site (818). The "live" production site (820) may serve the completed and approved HTML documents (822).

Figure 10B:
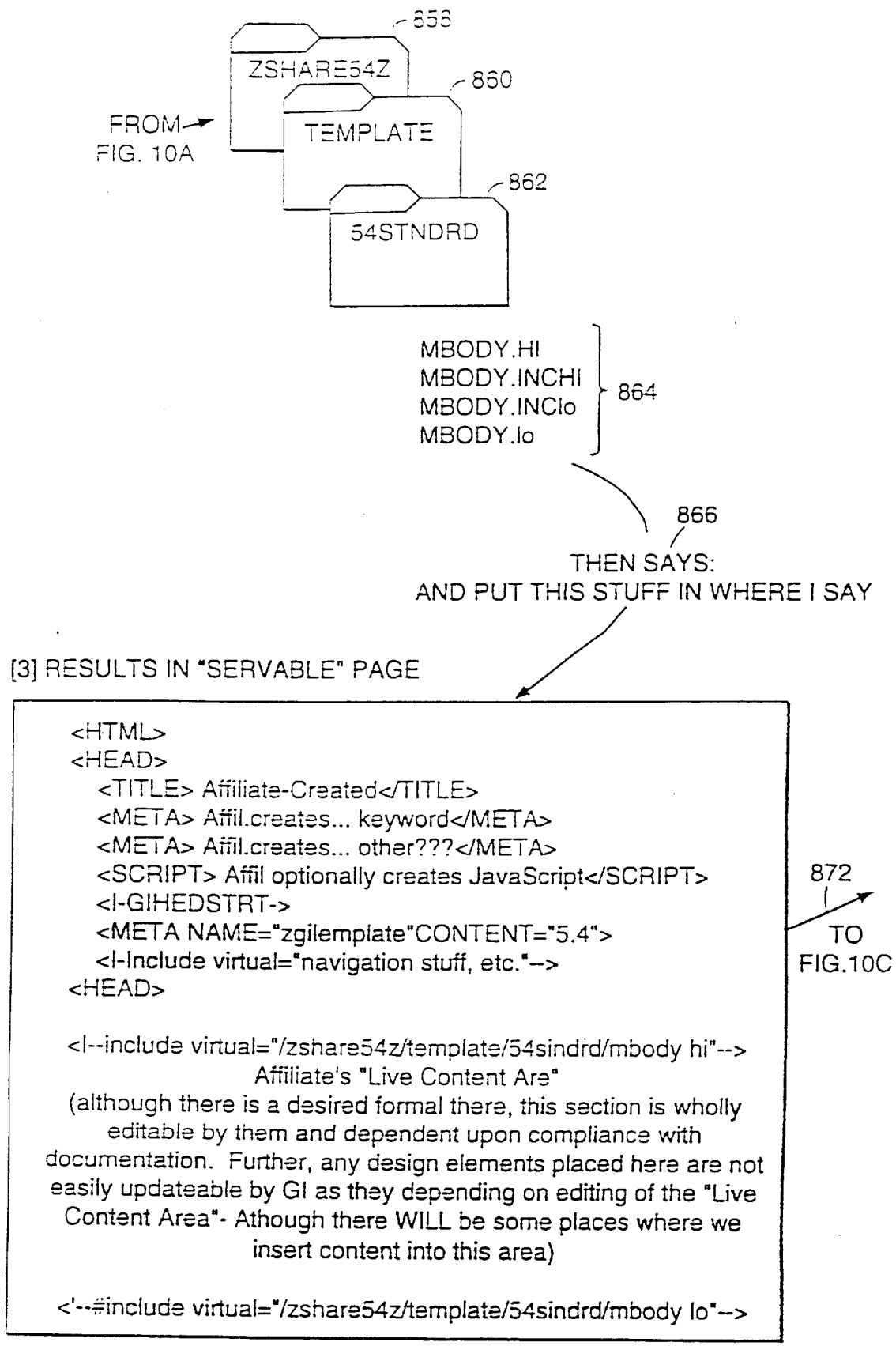

FIG. 10 provides a more detailed diagram of the CHEWY process. Once a HTML document is delivered to the /mcupload directory, the CHEWY process may open and process the document (850). HTML document (850) may contain codes in angled brackets "< >" that may be interpreted by the CHEWY process. The CHEWY process may also use the HTML document filename as information as to what global information may be used to generate completed HTML pages. For example, if the filename is "mbody.htm" the name of the file designates that CHEWY "tells" the document where to get design information and where to insert it in the template (854). One source of the design information may be the shared components repository— where '##' is the template version number for the "zshare##z" (858) directory, template (860) subdirectory and "##stndrd" (862) subdirectory which contains the "mbody.hi," "mbody.INChi," "mbody.INClo," and "mbody.lo" files. The CHEWY process may insert the files in the designated locations in the HTML page to create a web page that is suitable to "serve" (870). The suitable web page (870) may contain the appropriate server side "include" commands. The HTML include command is like the "#include" compiler instruction for the conventional "c" programming language. When a browser accesses the web page, the browser may receive a HTML page that contains the HTML commands necessary to display a complete HTML page, e.g., the #include instruction may be replaced with the HTML code referenced by the #include command (874).

Figure 11B:
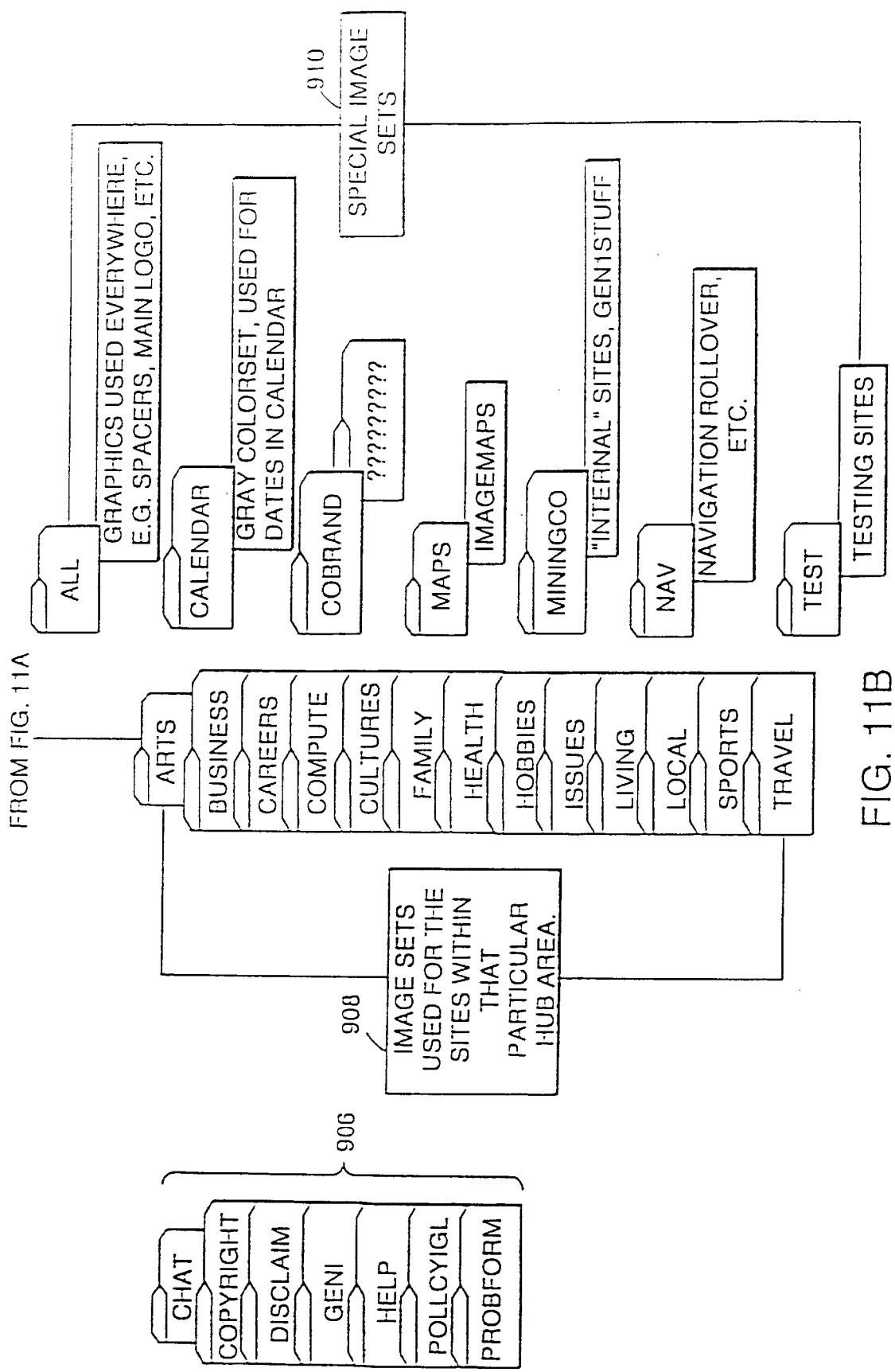

FIG. 11 provides a logical diagram for the file structure for the shared files in the collaborative data mining invention. The "zshare##z" (858) file is shown with the subdirectories depicted one level below in the HTML (890), images (892), js (894), nav (898), notice (898), search (900), ssw (902), events (904) and template (860) subdirectories. These subdirectories may in turn contain subdirectories of their own such as the subdirectories under the images (892) subdirectories including arts, business, careers, computer, culture, family, health, hobbies, issues, living, local, sports and travel.

Figure 12A:
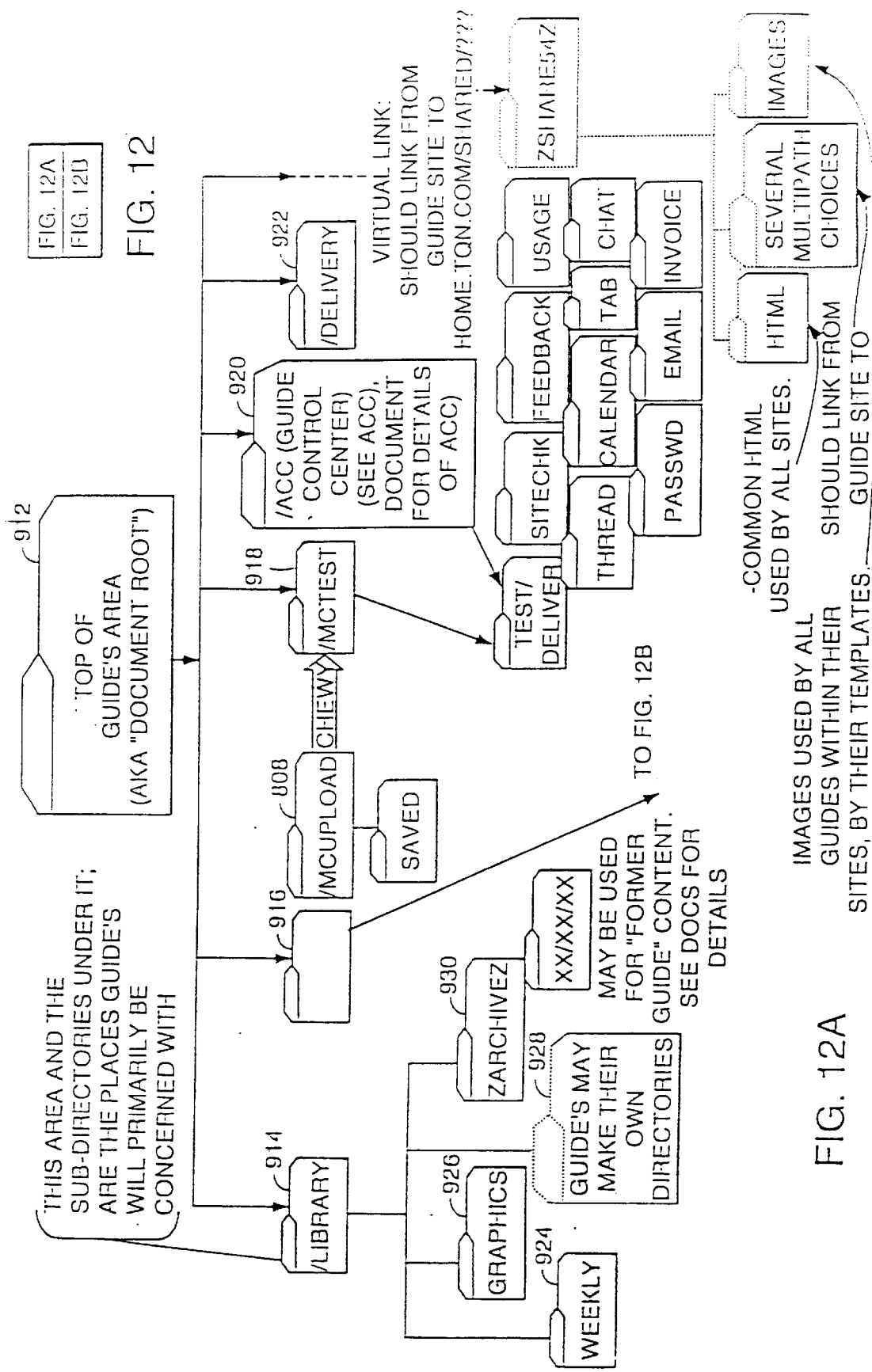
Figure 12B:
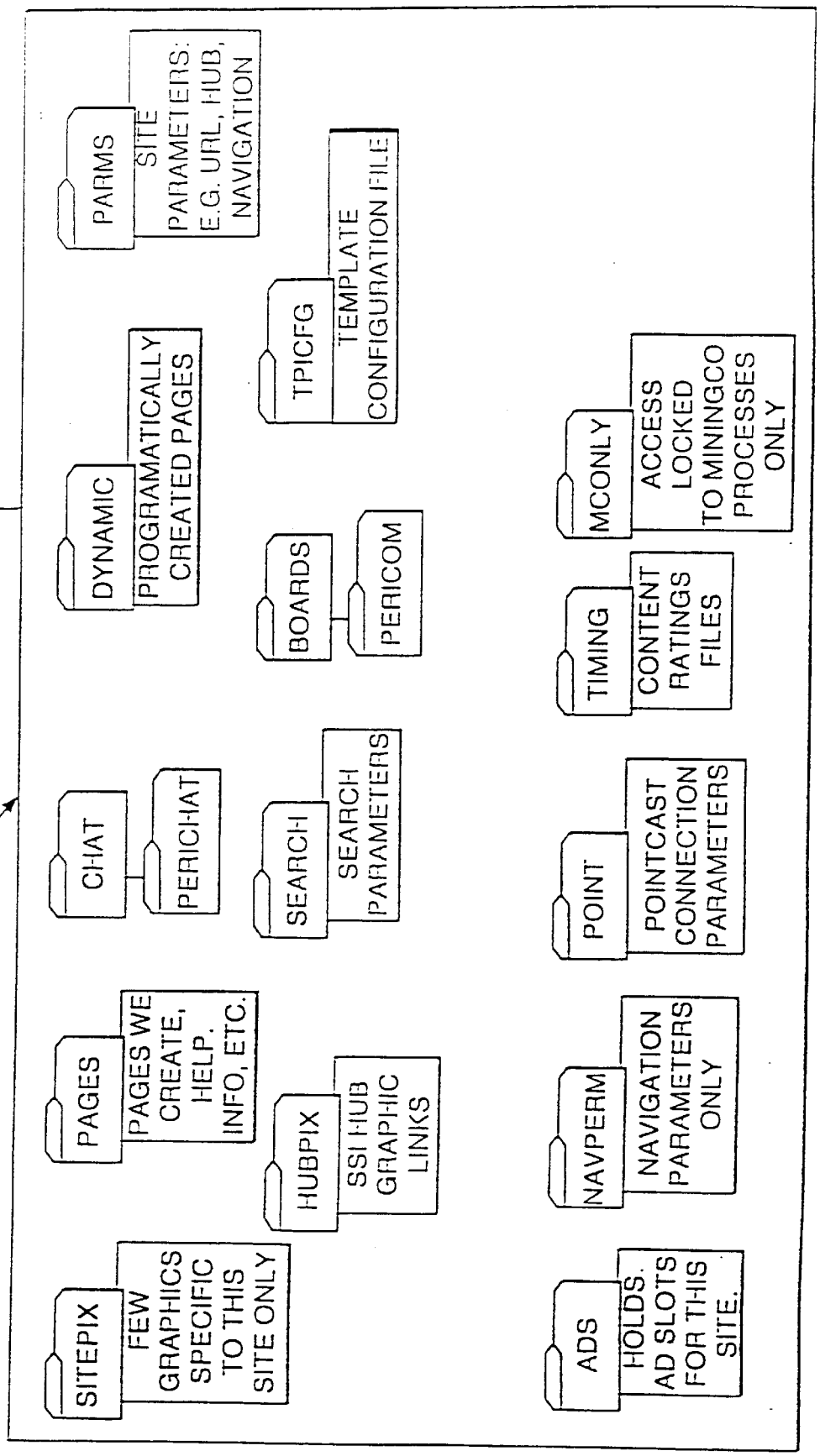

FIG. 12 provides an overview of a directory structure that may be used by a guide in a collaborative data mining system. The structure may be described as subdirectories depending from a root directory (912). The root directory (912) may be the default or starting point for the guide. The first subdirectory may be a "/library" (914) of further subdirectories to useful guide data, such as, weekly data (924), graphics (926), personal directories (928) and an archive directory (930). The next subdirectory may store subdirectories of information that is useful for the system (916). Information for the system (932) may include: a subdirectory of site specific pictures, graphics and/or images; a subdirectory of hub specific pictures, graphics and/or images; pages used by the system; search parameters that may be useful for outside search services to help find the site; a subdirectory for chat room parameters; programs, and/or other chat room related data; a subdirectory for boards such as board parameters, programs, and/or other board related data; a subdirectory for dynamic data for programmatically created web pages; a subdirectory for a template configuration file; a subdirectory for site parameters such as URL, hub and navigation parameters, a subdirectory for advertising data; a subdirectory for navigation parameters; a subdirectory for content ratings, and a locked subdirectory for system only access. The guide directory structure may include the upload (808) and test (918) directories described in further detail herein. The guide directory structure may also have a subdirectory for guide control center information (920).

Finally, the example of a guide directory structure may include a delivery (922) directory and the zshare##z directory described further herein.

Thus, the present invention employs a novel method that may eliminate the requirement to individually hard code HTML instructions at each of its sites for different logos, colors, artwork, etc. The present invention may also employ a novel software approach that builds into the web pages HTML instructions to "look for" missing site construction information, e.g., the color set for the site, at the server level. During the build process, the server is "told" the topic area of the site and the build process responds with information for insertion into a site's HTML code. Because of this novel approach, each site can be "manufactured" without hard coding all the design elements. This facilitates the scaleability of the design across many sites. It may also make possible collaborative work on the sites in a new way because certain elements of the system do not reside in the site's code but instead reside in a server working with many sites. This methodology may also make it possible to propagate changes to sites or groups of sites at the server level without the need to edit HTML code at all the sites thereby greatly increasing design and maintenance flexibility.

The Guide Application Process

Figure 2:
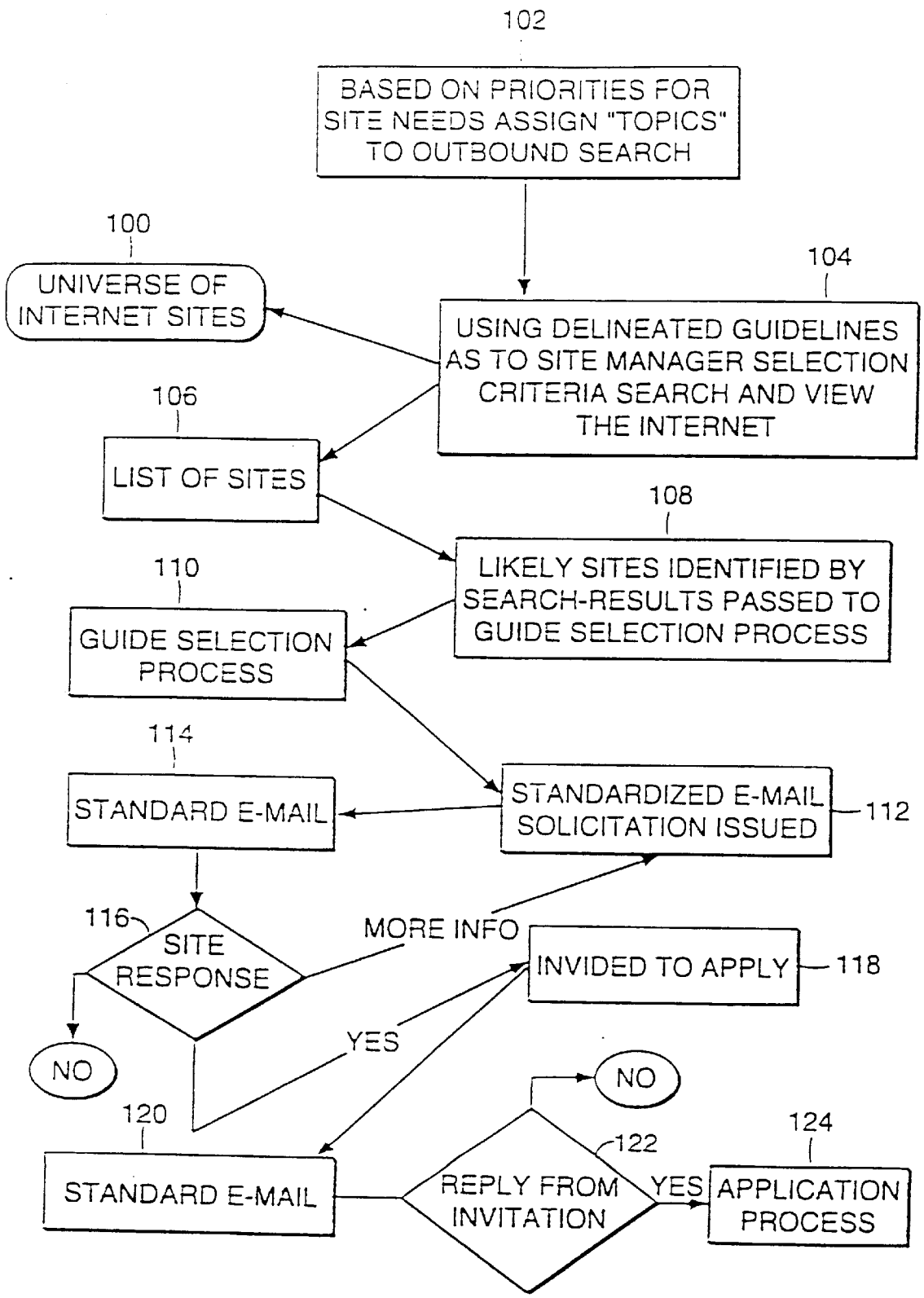
FIG. 2 shows a detailed diagram of the guide acquisition system (2). It is understood that the elements in FIG. 2 denote processes that may be executed on the systems of the present invention.

The automated guide recruitment process of the guide acquisition system (2) is further described in FIG. 2. The automated acquisition system may begin with an assignment of priorities and topics for the outbound search (102). The system may also use a set of guidelines in selecting a site manager such as a predetermined academic background or predetermined experience standards. Using these parameters, the universe of Internet sites (100) may be searched for candidates as web guides (104). A list of sites (106) is selected from the universe of Internet sites (100). The list of sites is passed (108) to a guide selection process (110). The guide selection process (110) may use predetermined subjective or objective criteria to select potential guides. A standardized e-mail may be issued (112) to the selected potential guide (114). The potential guide may respond (116) to the standardized e-mail (114) and request more information, decline the invitation or accept the invitation and be invited to apply (118). When a potential guide is invited to apply, (118) a standardized e-mail (120) may be sent conveying the invitation (120). The potential guide may reply to the invitation (112) by declining the offer or submitting to the application process (124).

Figure 3:
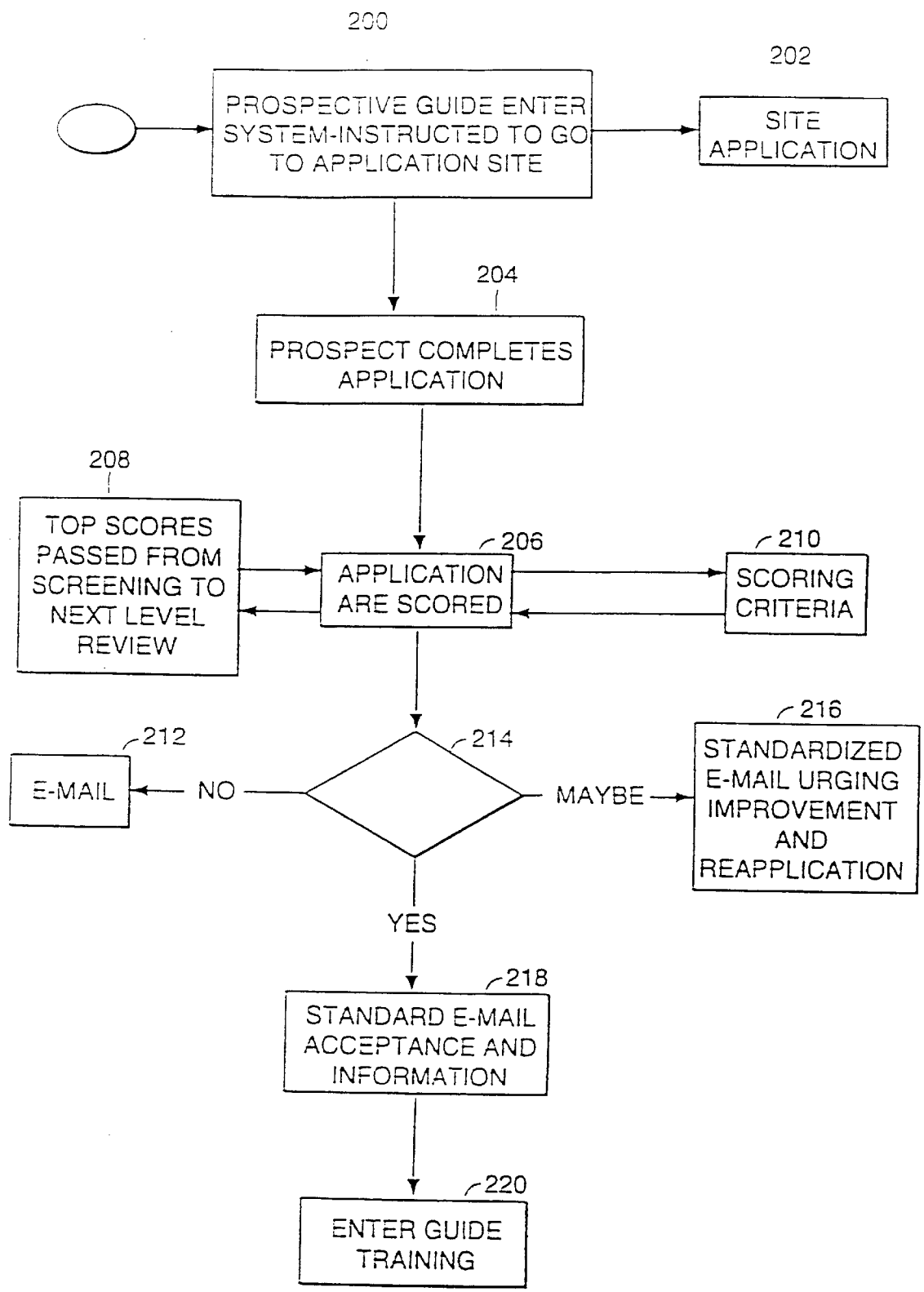
FIG. 3 shows a detailed diagram of the application screening system (4) in which a guide identified from the guide acquisition system (2) receives further processing to determine, inter alia, whether to select a particular guide for guide training.

FIG. 3 may provide a diagram of the process steps used to further process a potential guide's application to the network. Prospective guides may enter the system and are instructed to go to the application site (200). At the application site, the potential guide may receive the site application (202). The potential guides may complete and submit the application (204). The application may then be objectively or subjectively scored (210) by the data mining system and/or staff (206). The top scoring applications may be passed up for a higher level review (208). The application process may then reach a decision point (214) to determine a course of action for the guide application. If the guide application appears promising, the guide applicant may be issued an e-mail urging improvement and reapplication (216). If the guide application does not meet the performance criteria then the applicant may be sent an e-mail declining the application. If the application passes the performance criteria then e-mail may be sent to the applicant accepting the application (218). Once a guide application is accepted the applicant may enter guide training (220).

Figure 4:
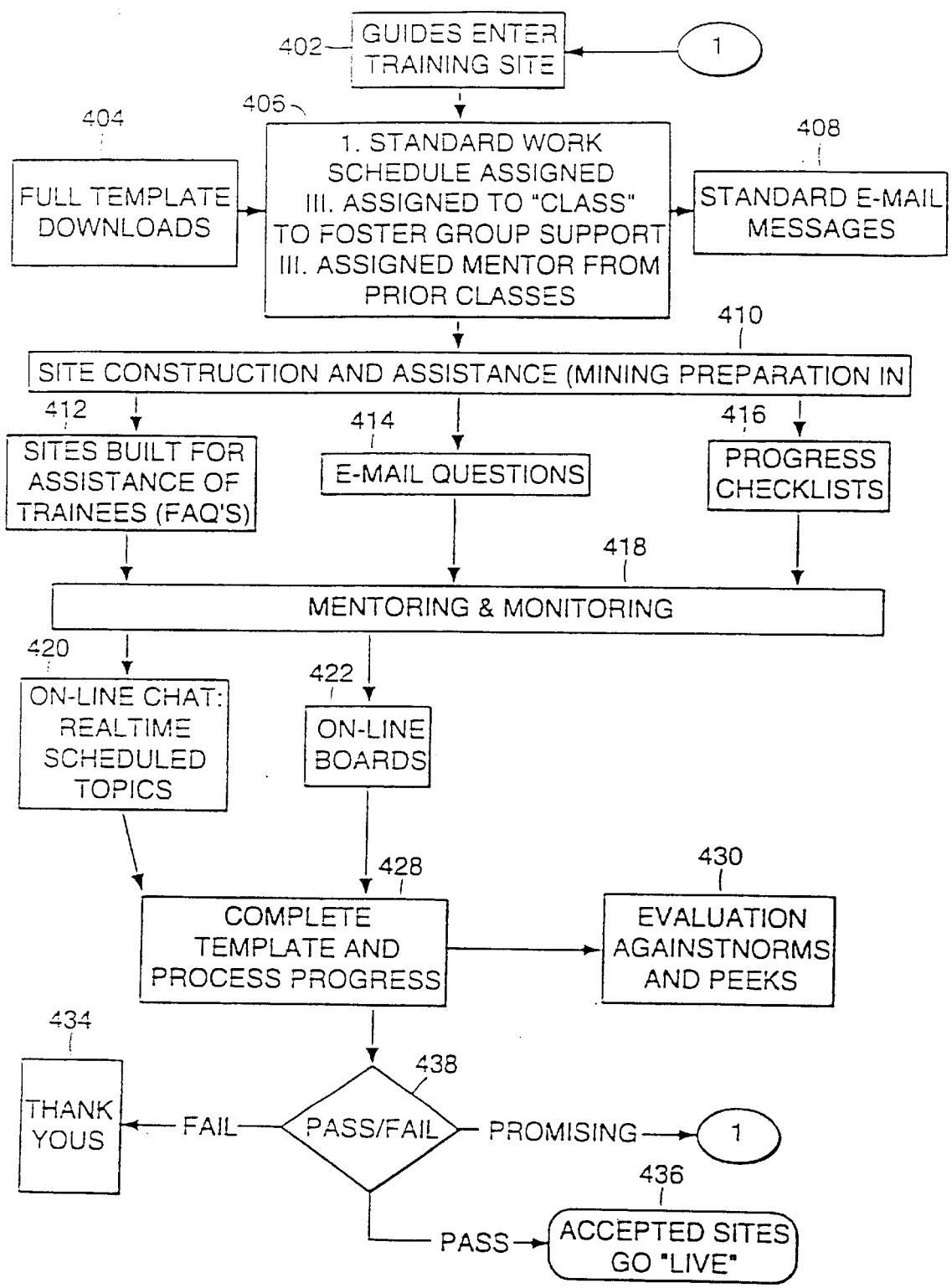
FIG. 4 shows a detail diagram of the mass mentoring system (8). Here, guides from the application processing system (4) receive training and feedback to use the templates and achieve the performance selection criteria demanded by the system. The guides receive specific training in the use of the template or pre-determined form methodology that interacts with the collaborative page generator system (12) and the global HTML data include files (10) to create on-line content.

FIG. 4 may provide a detailed diagram of the guide training process. Guides may enter the guide training process at block (402). Here, guides are assigned passwords and may be given access to the training system. A standard work schedule may be assigned, the guide may be assigned to a class, and a mentor may be assigned to the class at block (406). The guide applicant may be given the full template downloads to begin constructing their sites and following the training schedule (404). Standard e-mail messages may be sent to properly inform the guides of their responsibilities (408). The guide applicant may begin to construct their sites and receive assistance from the mentor (410). The guide applicant may view special sites built for trainees (412) and e-mail questions to the mentor (414). The system may track the applicant's progress through system checklists (416). The guide applicants may then receive feedback and instruction on their site construction in the mentoring and monitoring phase of training (418). Guide applicants may be scheduled to participate in on-line chat groups on scheduled topics (420). Guide applicants may also log on-on line bulletin boards to retrieve FAQs and the like to assist the guides with site construction. Once a guide completes the template HTML documents and successfully submits them to the CHEWY process, described above (428), guide performance may be evaluated against the performance of other guides (430). If the guide has produced an acceptable site then the site is accepted and transferred to the live site (436). If a guide continues to unsatisfactorily perform, then the guide is sent a thank you and dismissed (434). Guides that produce promising sites may be sent back for more training (402).

Figure 4A:
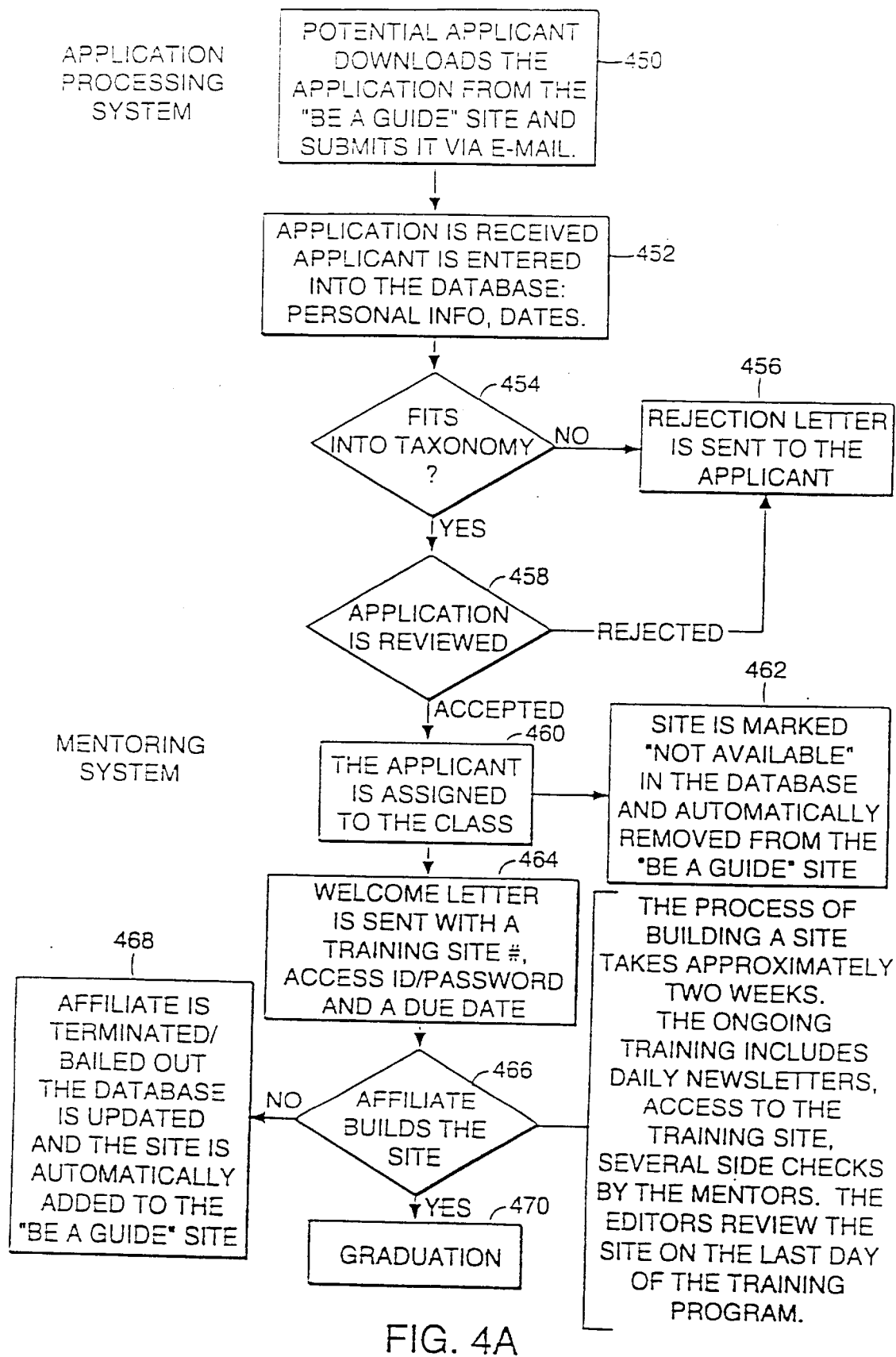
FIG. 4A provides a detailed flow diagram of the application processing system and the mentoring system.

FIG. 4A may also provide an application processing system and mentoring system for the collaborative data mining system. Here, a potential applicant may download an application from a web site or HyperText link from the Internet (450). The applicant may receive a web page or a file download by FTP or other conventional file transfer means that contains the application materials. Once the applicant receives the application, the applicant may provide the application details and submit the application to the collaborative data mining system. Once the application is received by the collaborative data mining system, the data may be entered manually or automatically into a database (452). The application may then be reviewed either automatically or through intervention to determine whether the application fits into the taxonomy of the collaborative data mining system (454). The taxonomy of the collaborative data mining system is the structure of the universe of data or topics sponsored by the system, e.g., the genus and species of the topics supported. If the application does not fit into the taxonomy the application may be rejected (456). If the application does fit into the taxonomy then the application may be reviewed (458). If the application is accepted, applications may be judged by predetermined criteria as described above, and if appropriate the applicant is assigned to a class (460). If the application is rejected, a rejection letter or e-mail may be sent to the applicant (456). Once an applicant has been accepted for training by the network, the site may be marked as not available for further applications (462). This step may encourage the applicant to complete the guide training process. After an application is accepted a welcome letter or e-mail may be sent to the applicant (464). The welcome letter or e-mail may contain an address for the training cite and a password and user identification. The guide applicant may now be called an "affiliate" by the network and may begin building a site with the template and collaborative techniques described herein (466). If the affiliate fails or quits the process at this juncture, the system may automatically or through intervention note that the site is again available for applications (468). Hopefully, however, the affiliate will successfully complete the guide training process and proceed to graduation from the training process (470).

Figure 5:
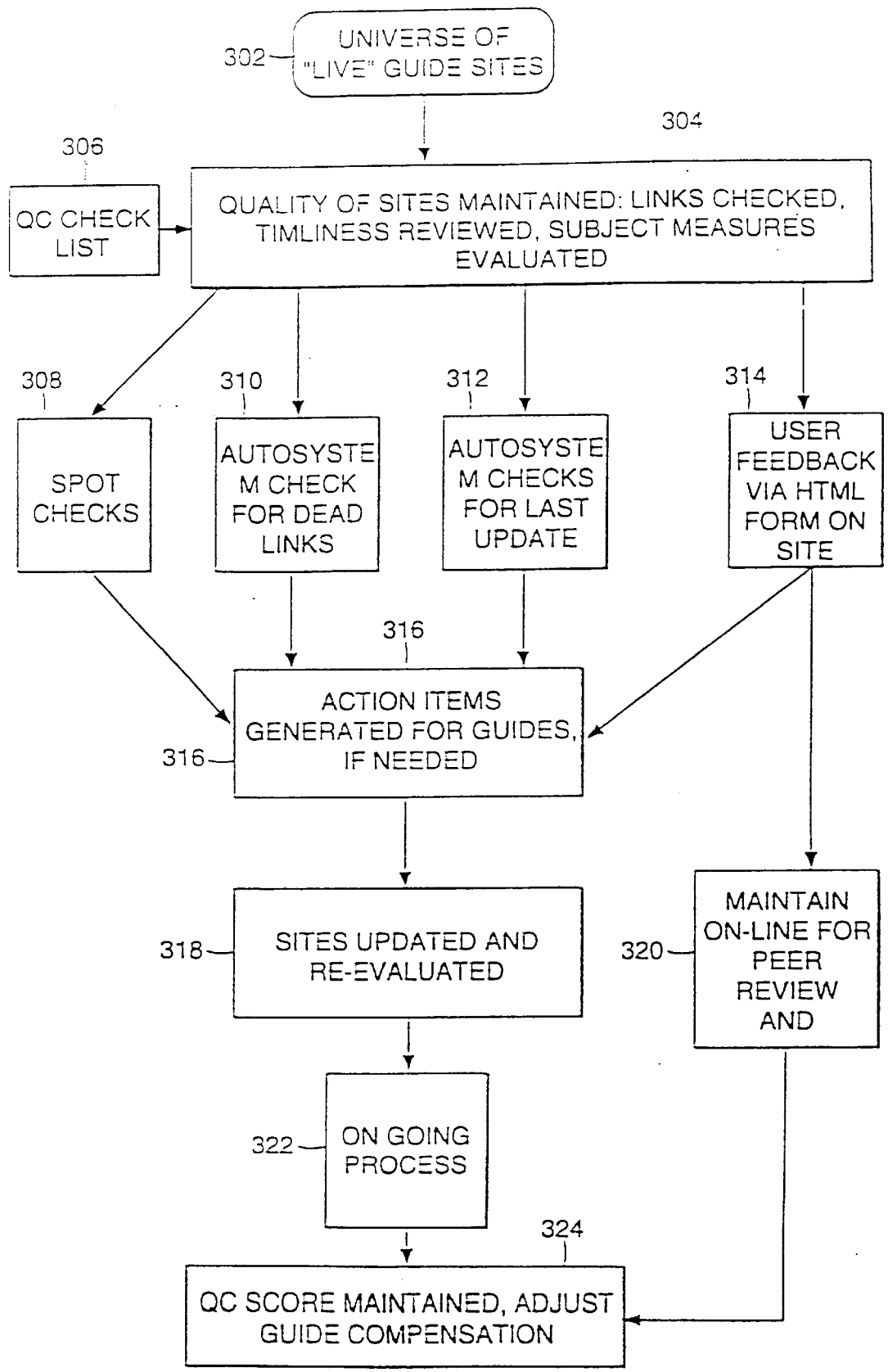
FIG. 5 shows the detailed diagram of the present invention's quality control process. Here, sites may be checked, observed and tested to "police" the performance, quality and activity of the guides of the present invention.
Figure 5A:
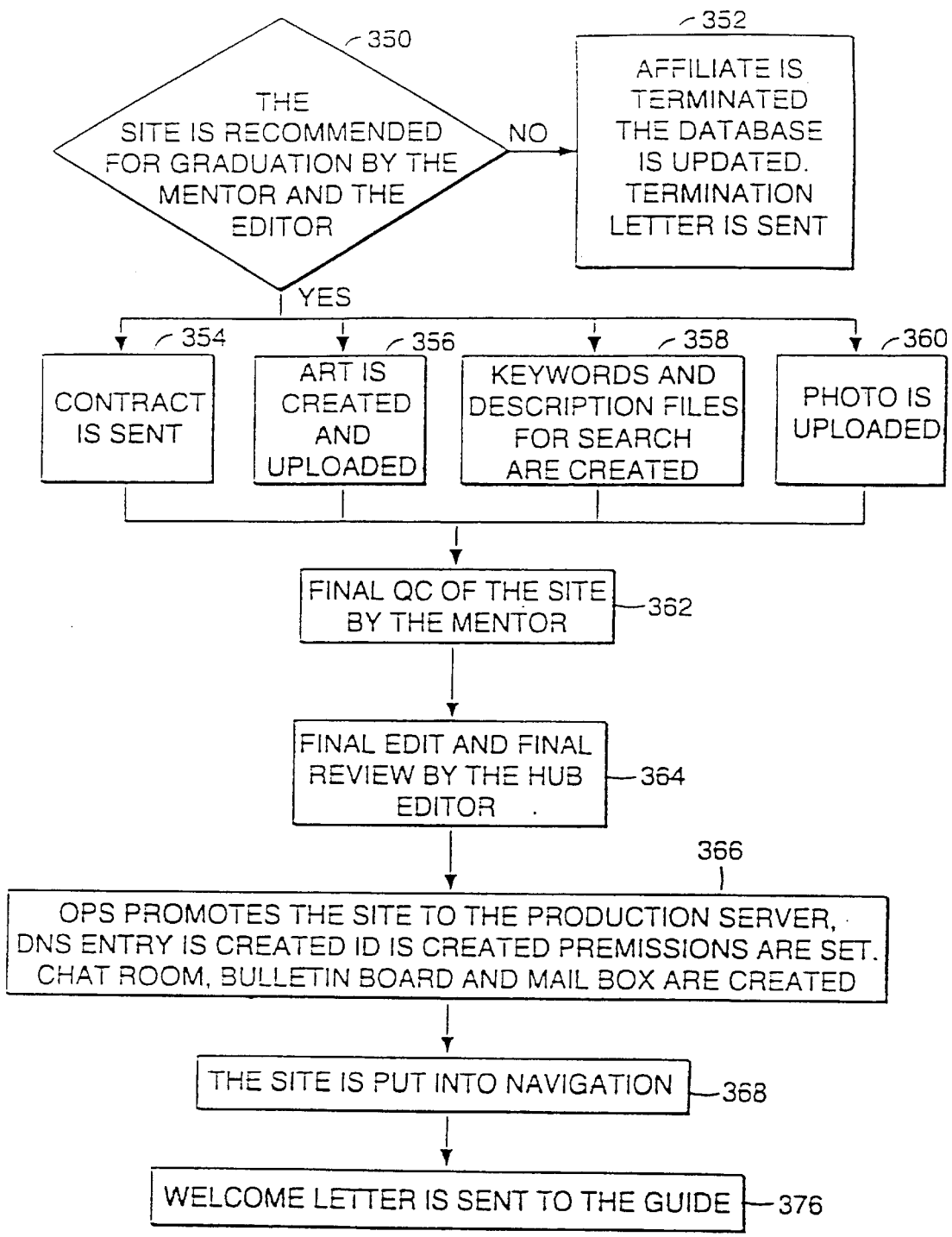
FIG. 5A provides a detailed flow diagram of the logical steps that may execute after a guide graduates from training.

FIG. 5A may provide a block diagram of the functions the system may perform at the graduation of a guide. Initially, the guide is either recommended for graduation by the mentor and/or the editor (350). If a guide is not recommended for graduation, the affiliate may be terminated and the database updated to show the availability of this site topic (352). A termination letter or termination e-mail may be sent at this step (352). If a guide is graduated from the training process several steps may occur within the system. First, a contract may be sent to the affiliate which may provide the terms and conditions of the relationship with the system (352). Second, art may be created and uploaded onto the system that may be necessary to support the affiliate (356). Third, keywords and description files for the search and/or support for the site may be created (358). Finally, a photo of the affiliate may be input into the system to provide a picture of the guide to the system's users (360). After these steps are performed, the network may provide the site for a final quality control check by the mentor and/or the editor (362). The quality control check may include the automated site checking process described herein. After the quality control check, the site may be subject to a final edit and review by the hub editor (364). The hub editor may be assigned with editorial responsibility for a specific genus of topics and related topical sites on the system. The system may then promote the site to the production server, create a DNS entry and set permissions for the chat room, bulletin board and mail box subsystems (366). The site may be entered in the navigation system for the collaborative data mining system so that users may navigate to the site from within the network (368). Finally, a welcome letter may be sent to the guide (370).

Figure 13A:
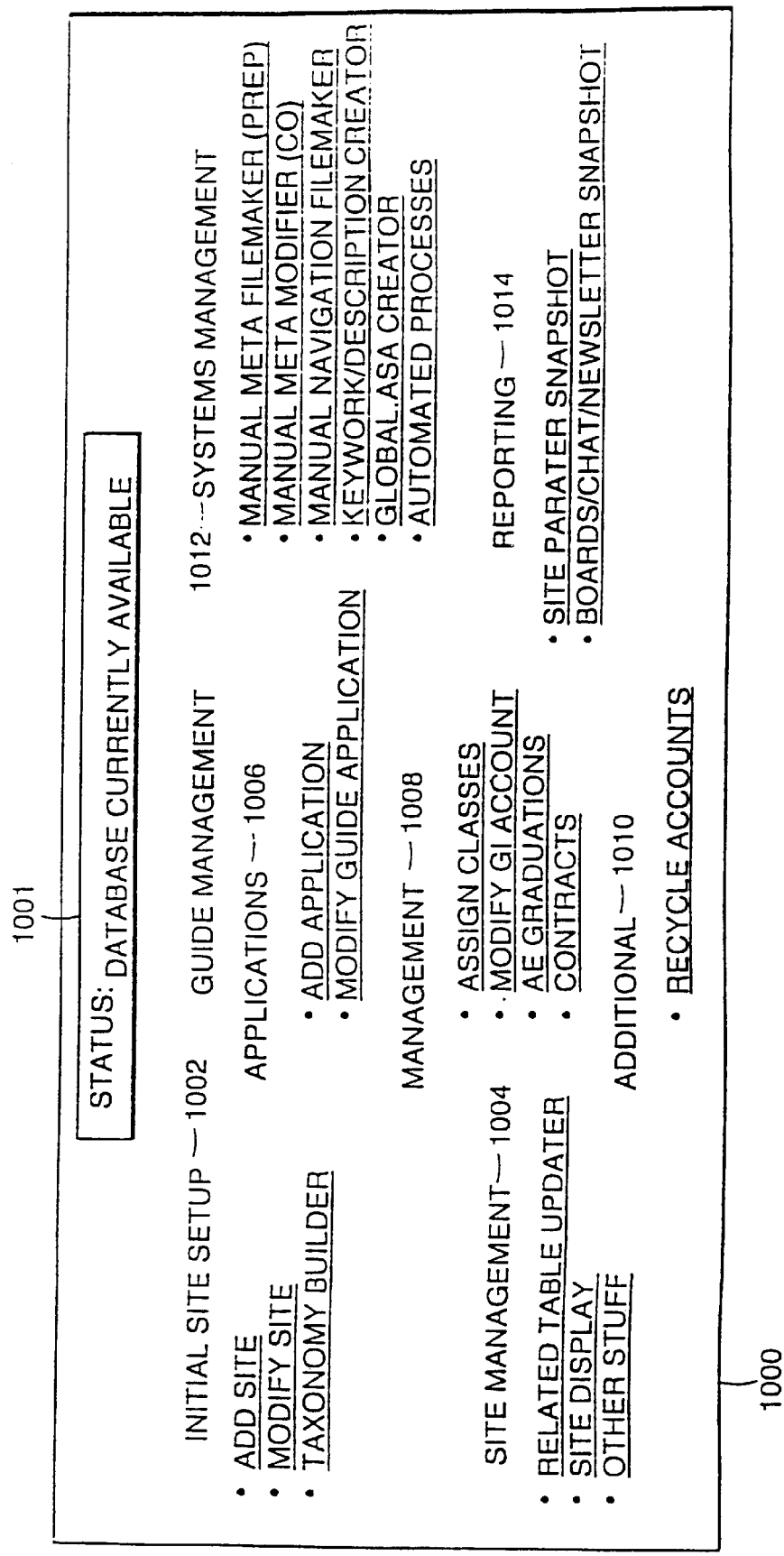
FIG. 13A shows a functional diagram for the automated training and management system used to manage and control a collaborative data mining system.

The application processing, guide training, and the collaborative data mining system in general may be monitored and controlled by the ATMS system. FIG. 13A may provide the main screen of an ATMS system for a collaborative data mining system (1000). The main screen may provide a status bar to show the status of the system database (1001). In general, the ATMS main screen may be divided into the following logical components: Initial site setup (1002) which may include the subtopics to add a site, modify a site and build the taxonomy of the collaborative data mining system; Site Management (1004) which may include subtopics to update related tables, display a site, and miscellaneous functions; Applications (1006) which may include subtopics such as adding an application or modifying a guide application; Management (1008) which may include subtopics to assign classes, modify accounts, graduate guides and distribute and/or modify contracts; Systems Management (1012) which may include subtopics to access a manual META filemaker, access a manual META modifier, access a manual navigation filemaker, a keyword description creator, a global ASA creator and access automated processes; Reporting (1014) which may include subtopics to provide a site parameter snapshot and provide boards, chat and/or newsletter snapshots and; Additional (1010) which may include a subtopic to recycle accounts.

FIG. 13B may provide a diagram for adding a site to the collaborative data mining network taxonomy (1016). The template may include the name of the hub on the network (1018). The hub may provide a first horizontal division of the topical taxonomy. Within the hub a further delineation of the structure may be made with the section name (1020). The structure may in turn may be further delineated into the exact site name (1024). A data field may be provided to indicate the character site identification (1024) and the site navigation name (1026). The "live" data field may provide a "radio" button indication of the status of the site (1028). Site status indications may include whether the site is live and active, whether there is no interest in adding such a site to the taxonomy, whether the site topic is interesting, whether the site has been eliminated "X" from the taxonomy, and whether the site is active "A" and a guide is in training. A data field may be provided that indicates whether the site has a newsletter (1030), a chat room (1032), a bulletin board (1034) and/or classified adds (1036). A data field may indicate whether the site has disclaimers such as legal, medical, financial and/or official game. A final data field may be provided that indicates whether a copyright notice is on the site (1040). The add new site function may include a submit query bar (1042) to submit a query to the network. A reset function may be included to reset the form (1044).

FIG. 13C may provide a diagram of the functions that may be used to modify a site on the collaborative data mining system (1046). The functionality of the modify a site control may be similar to the add a site control described above. The modify site control may include a hub data field (1048), a section name data field (1050) and an exact site data field (1054). A data field for the site navigation name may be provided (1056). A data field with radio buttons to indicate the status of the site may be provided (1058) as described herein. Data fields may be provided to indicate and/or modify whether the site has a newsletter (1060), a chat room (1062), boards (1064) and/or classified advertising (1066). A data field may be provided to indicate and/or modify the sites disclaimers such as legal, medical, financial and/or official game (1068). A data field may be included to indicate and/or modify whether the cite has a copyright notice (1070). A data field may be provided to indicate whether the site maintains a Citibank™ profile (1072) and whether the site has business listings (1074). The custom profile feature such as the profiles in (1072) and/or (1074) may direct a collaborative data mining system to specifically "brand" the site or advertise on the site with the designated profile. The present invention may contain profiles for a plurality of customer profiles to create virtual collaborative data mining networks or subnetworks within a larger collaborative data mining network. The modify site menu may have a submit query function that may also modify the data entry (1076). And finally, the modify site menu may have a reset button to reset the menu (1078).

FIG. 13D may provide a guide management function to add an application (1080). This guide management function may be used to add a new guide application to the system described herein to begin the guide training process. For example, the guide management system may provide an "Air Travel" site application (1082). The site application may provide a username data field (1084) to receive a user name. A date field may be provided to receive or provide the current date (1086). Data fields for the title (1088), first name (1090), last name (1092), legal first name (1094), legal last name (1098) and e-mail address (1098) may be included to receive information about the applicant may be included. Data fields may be provided for a secondary e-mail address (1100), an addresses line one (1102), an address line two (1104), a city data line (1106), a state data line (1108), a zip code (1110), country (1112) and telephone information (1114). A data field may be provided to indicate what operating system the guide uses and/or intends to use (1116). A data field may be provided to track when the application was received (1120) and when and if the application was rejected (1122). The status of the application may be tracked with a pull down data field (1124). A data field may track whether the applicant was a referral and by whom the applicant was referred (1126). A referrer name data field may also be provided to track the name of a referrer (1128). A data text field may be provided to receive general comments on the guide application (1130). The add application menu may provide a submit function button (1132) to submit the application to the system and a reset button (1134) to reset the guide application screen.

FIG. 13E may provide a guide application modification menu to modify the data or status of a guide application. The guide modification menu tracks the add guide menu described above in FIG. 13D and its description is incorporated herein.

Figure 13F:
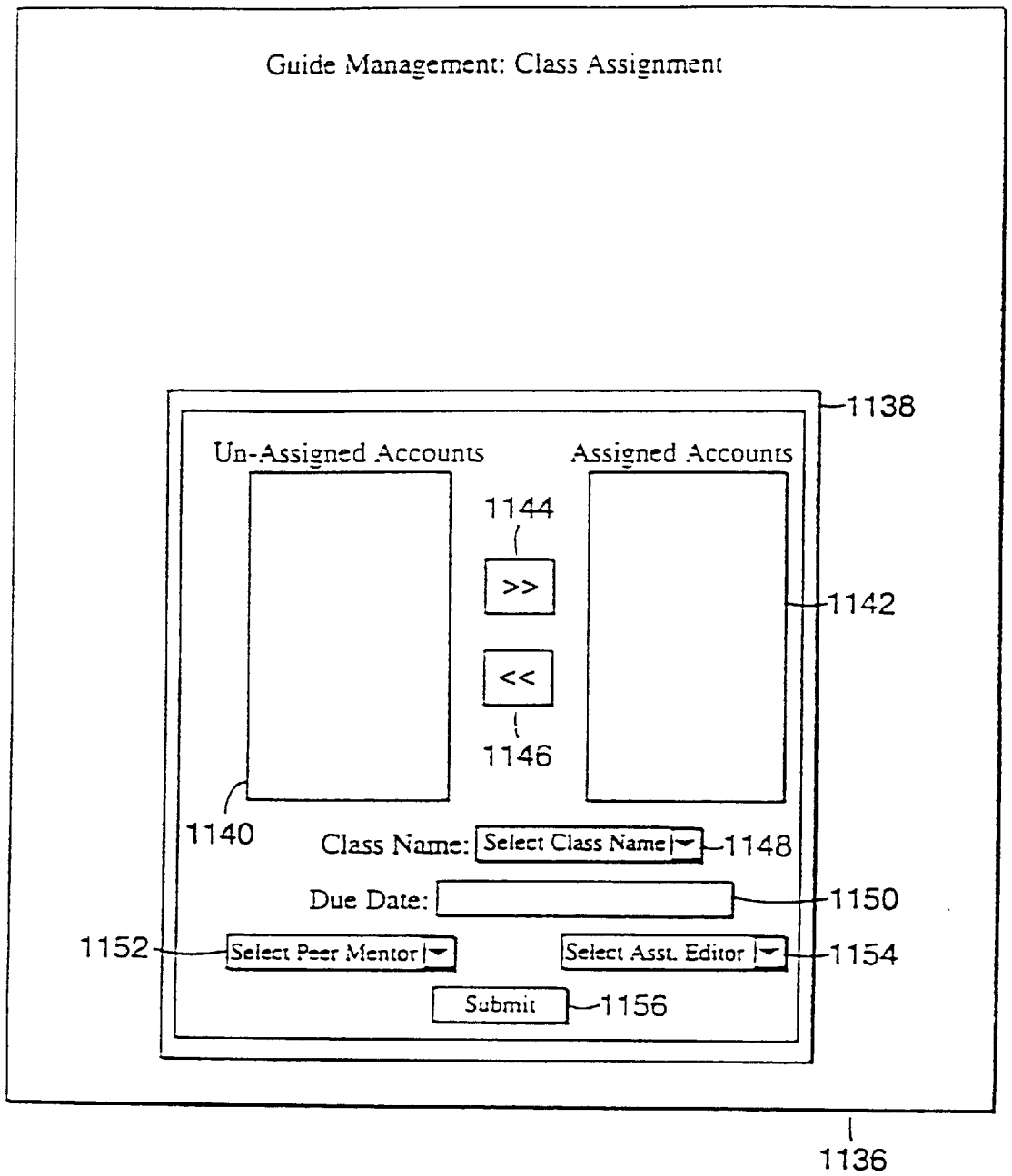
FIG. 13F provides a detailed diagram of an ATMS control screen to group new applicants into classes and assign graduation dates.

FIG. 13F may provide a means for assigning guides to classes for guide training (1136). A data menu may be provided (1138) to move accounts from an un-assigned status to an assigned status. A data field may be provided to list un-assigned accounts (1140). Function buttons may be provided to move accounts to an assigned status (1144) and assigned account back to an un-assigned status (1146). A data field may be provided to list assigned accounts (1142). A class name pull down menu may be provided to select a class name (1148). A due date data field may be provided to indicate a due date for the class (1150). A pull down menu may be provided to select a peer mentor (1152) and a pull down menu may be provided to select an assistant editor (1154) for the class. A function button may be provided to submit the form for data entry (1156). The class assignment menu may function by highlighting a list of accounts from the unassigned data field (1140) and clicking the add function button (1144) to move the highlighted accounts to the assigned accounts data list. Once accounts are in the assigned data field, a user may assign a peer mentor and editor to the class. When the submit function button (1156) is pressed the ATMS may create a new class for the guide training program described herein.

Figure 13H:
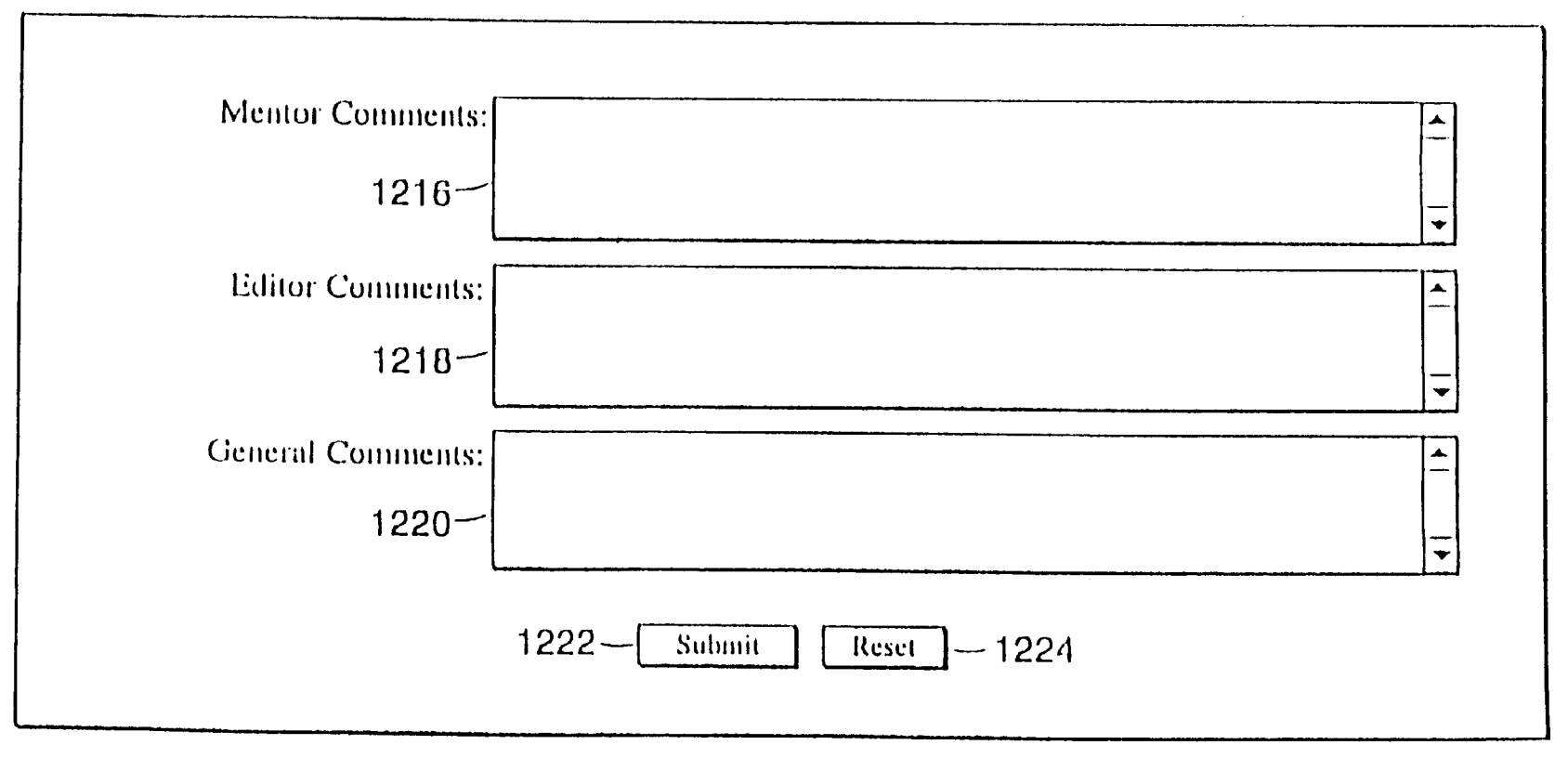

FIG. 13G may provide a guide management function for tracking and modifying the guide accounts on a collaborative data mining system. An account tracking and modification menu may be provided (1158) to track and/or modify each guide in the network. The account tracking menu may provide identification information such as a tracking number (1160), a user name data field (1162), a current date data field (1164) a site name data field (1165), a title data field (1166) and guide information such as the first name (1168), the last name (1170), e-mail address (1172), a secondary e-mail address (1174) and a telephone number (1176). Data fields may be provided to include a class name (1178), class mentor (1180) and/or peer mentor (1181). Data fields may be provided to track and/or schedule the guide's progress through the development process such as a due date field (1182), a review date field (1184), an active date field (1186), a graduation date field (1188) and a termination date field (if any) (1190). A pull down menu may be provided to indicate the reason (if any) a guide was terminated (1192). A pull down menu may be provided to indicate the application status (1194) and whether there is any reason the application is on hold (1196). Data fields may be provided to track the dates for the system's review such as the final quality control date (1198), the final edit date (1200), the final review date (1202), the hold date (1204) and the promotion date (if any) (1206). Data fields may also be provided to track when a contract was sent out to the guide (1208) and whether the contract was sent back (1210). Radio button type data fields may be provided to indicate whether a photograph has been received (1212), whether the navigational links for the site are in place (1214) and whether the art for the site is ready for deployment (1215). FIG. 13H may provide additional data fields for the guide management account tracking and/or modification system. Text data fields may be provided to receive mentor comments (1138), editor comments (1140) and general comments (1142) about the guide and/or the account. In general, the functionality provided in this menu provides a means for tracking the guide's and a site's progress through the mentoring system. The menu provides a function button (1222) to submit and/or track the relevant data in the network. The system also provides a reset button (1224) to reset the data menu.

FIG. 13I may provide a means for guide management for affiliate graduations (1226). This tracking and status menu may provide identification information like that described above and incorporated herein, to identify the guide, the class and other appropriate information as described above. In this example, the guide has been placed on hold and the reasons therefore are indicated in the hold reasons data field (1232). The example also shows text information that more specifically describes the status in the mentor comments data text field (1334). This guide management function provides the submit function button (1228) and the reset function button (1230) to submit and/or reset the function respectively.

FIG. 13J provides a means for tracking and managing the details on the particular contract with each guide in the network. A guide management menu may be provided for managing and tracking guide contracts (1340). The contract management menu may provide a data field for the guide identification number assigned by the system (1342), a guide username (1344) and the current date (1346). Data fields may be provided for identifying the guide such as the guide's first name (1348), last name (1350), legal first name (1352), legal last name (1354), e-mail address (1356) and secondary e-mail address (1358). A data field may be provided to identify the exact site name (1360) as well as historical information such as when the application was received (1362). A data field may be provided to identify a contract number (1364) and whether the associate agreement has been sent out (1366) and whether the associate agreement has been received back (1372). Data fields may be provided to identify a license (1374) and the payout amount for the guide's services (1376). A data text field may be provided to note any contract addendum(s) (1378) and general comments (1380). The guide management function also provide data fields to note a termination date (1382) and a reason for the termination (1384). This guide management function may also provide a submit function key to submit and/or track data (1386). A reset button is also provided to reset the data form (1388).

The Quality Control Process

The quality control process of the present invention may be used to automatically check the quality of web sites that are managed by the collaborative data mining system. Thus, the data mining system of the present invention has taken what was once a subjective human-resource intensive process and refined it to a checklist that may be completed in 20 minutes per site. This degree of refinement, as well as the technical enhancements for e-mail and tracking allows the present invention to ensure quality across the whole network by allowing the system to check all sites biweekly.

FIG. 5 provides a detailed diagram of a quality control process that may be used by system element (24). The quality control process may begin with a list of the live sites maintained by the network (302). The quality criteria of the sites may used to create a predetermined quality control checklist (304) and (306). The quality control process may perform spot checks (308) of the list of the web sites maintained by the system. The quality control process may use a software routine to automatically check a site for dead links that reference other web pages (310). The quality control process may use a software routine to check when the site was last updated to assure that the guide is actively participating (312) in the network. The quality control process also may check for feedback from other web users (314). From these quality control subroutines a list of action items may be generated for the guides (316). After a predetermined time, the sites may be re-evaluated to check for compliance (318) with the list of action items generated above (316). The quality control process may also maintain a confidential or public on-line forum for peer review (320). The total quality control scoring and tracking of the number of "hits" may be used to adjust the financial compensation for the guide (324).

The Frame System

Figure 6:
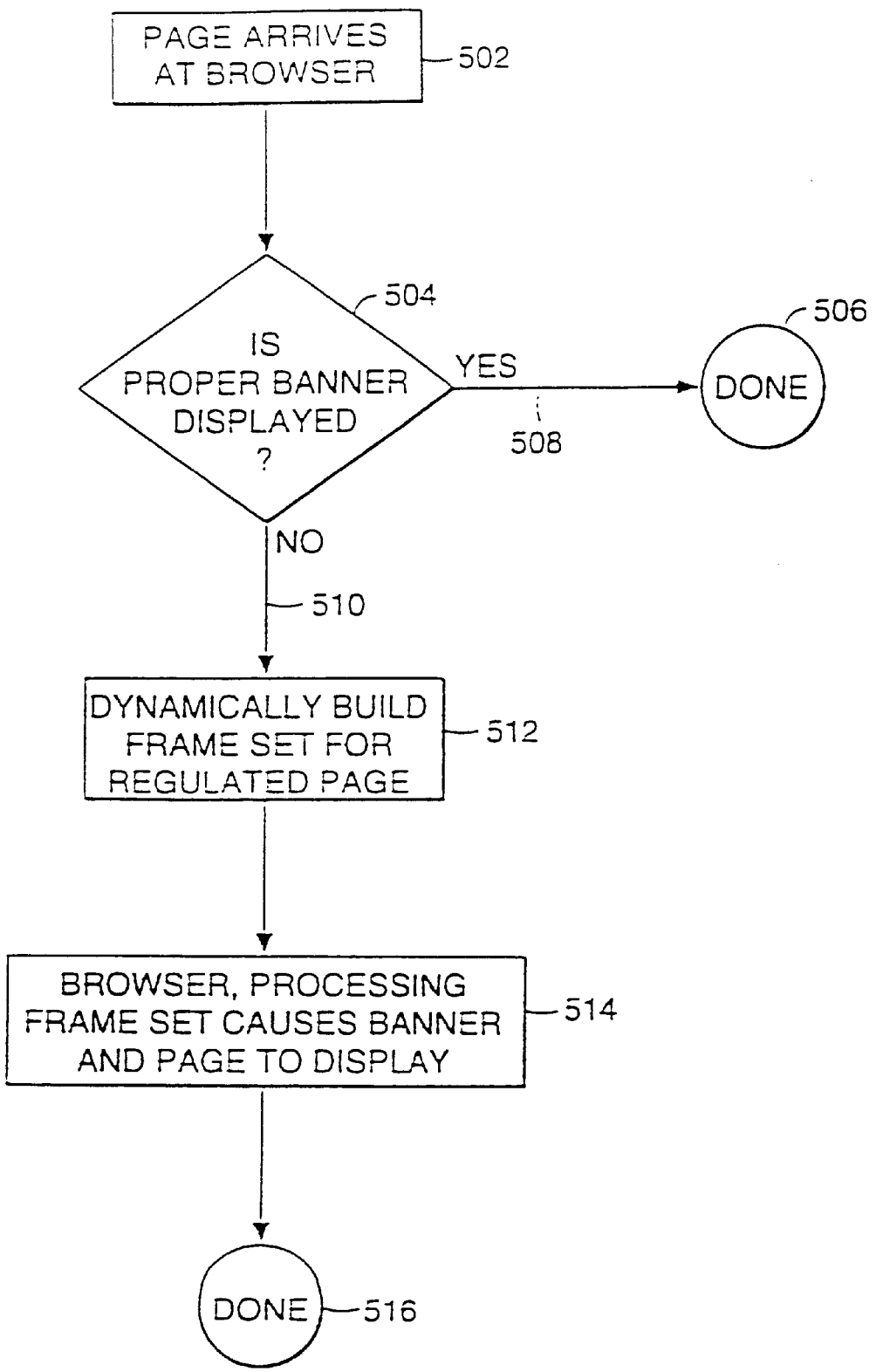
FIG. 6 shows the detailed diagram of the frames system (18) which provides a means for supporting frame based data.

FIG. 6 provides a detailed diagram of the frame system. The frame system assures that the proper frame set is displayed at the end user's web browser no matter how that user entered into the network of sites in the collaborative data mining system. More specifically, a page may arrive at a web browser (502). At that time, embedded java script code may be executed to query the "frames" object. If the frames object is greater than one then the java script may ask the object for the name of frame number one. If the name of frame number one designates a predetermined frame then the system knows the appropriate banner is already displayed (508) and the frame system does nothing more (506). If, however, the name of the frame is not the predetermined frame (510) then the system dynamically builds the frame set for the requested page (512). The frame system may then pass the frame set and appropriate data to the browser where the browser can process the frame set and cause the appropriate banner and page data display (514). The frame system may then exit (516).

Figure 6A:
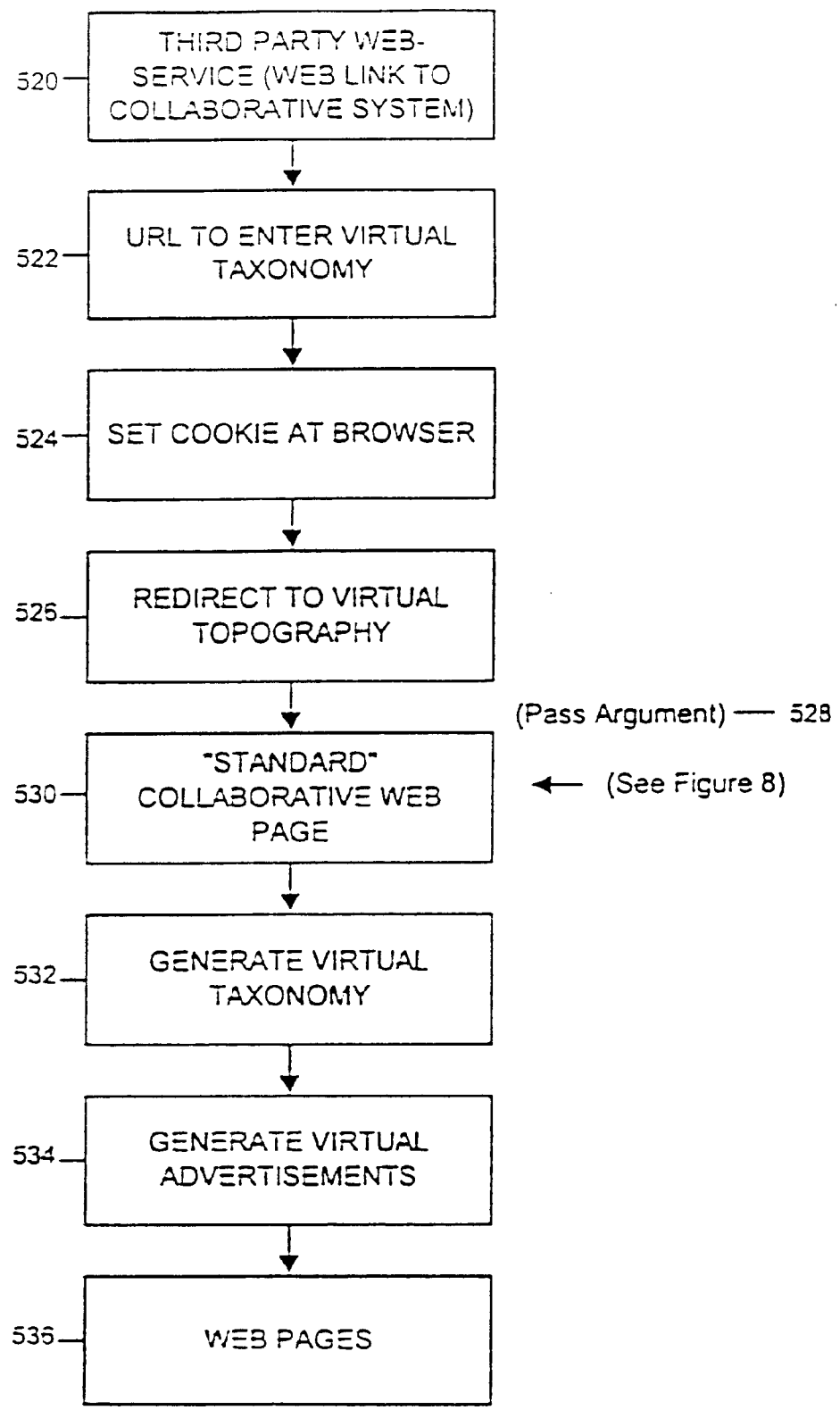
FIG. 6A shows a logical flow diagram to generate co-branded topologies and sub-topologies of the collaborative internet guide system.

FIG. 6A may depict the collaborative guide system of the present invention processing links from third party web pages. In processing links from third party web sites, the present invention's collaborative page generator system can customize the taxonomy of the system and co-brand the generated web pages. The system may co-brand generated web pages by displaying the third party's brand logo, color scheme or distinctive mark(s) or trade dress and by limiting the advertising displayed on the page. For example, the collaborative system may be programmed to filter out advertisements from the third party's direct competitors when the collaborative system generates pages within the co-branded taxonomy. Furthermore, the system may be programmed to filter advertisements and the taxonomy that the third party finds objectionable, e.g., links to competitors sites, links to sites that contains sexual content and the system's taxonomy that contains sexual content and/or any other taxonomy restrictions.

The restrictions to the collaborative system taxonomy may, in effect, create a virtual taxonomy for each third party supported by the system. For example, a third party internet site may wish to provide links to information available on the collaborative system of the present invention. However, they may find the discussion in the health section of the collaborative taxonomy and, more specifically, the section on sex within the health section to be objectionable and not wish that information to be displayed or affiliated with the co-branded web pages. In another instance, the third party may wish to restrict the taxonomy to only business and financial related sites and exclude all other sites in the collaborative taxonomy.

FIG. 6A shows a methodology whereby the taxonomy of the present invention can be modified to allow a user who accesses the collaborative guide system through the third party link to receive a customized taxonomy while maintaining the ability to navigate the customized taxonomy of the collaborative guide system.

Block (520) may represent a web link on a third party web service to the collaborative system. Such a link may be generated in a response to a search request or through the third party placing a link on the site to the collaborative guide system of the present invention. This link may point to a predetermined URL for entry into the collaborative system, e.g., the virtual taxonomy of the collaborative system (522). A predetermined URL may be created for each third party account.

A script file or executable program may be located at the predetermined URL. The script or executable program may set a parameter (or a cookie) at the participant's web browser to denote a predetermined profile that may identify the third party site as the point of entry to the system. The programming of the parameter or the cookie may be performed at logical step (524).

After the cookie or parameter is set (524), the script or executable program located at the predetermined URL (522) may redirect the URL request into the collaborative web system (526). The redirection may point to the URL within the taxonomy of the collaborative guide system. The URL re-direct may pass an argument on the URL redirect command (528) that indicates the profile for the third party web service should be employed by the system.

A "standard" collaborative web page from the system (530) may be generated by employing the argument passed from the redirect command 526. It is understood that the information passed in the argument may be located within the cookie set above (524) or be embedded in the URL redirection.

Figure 8:
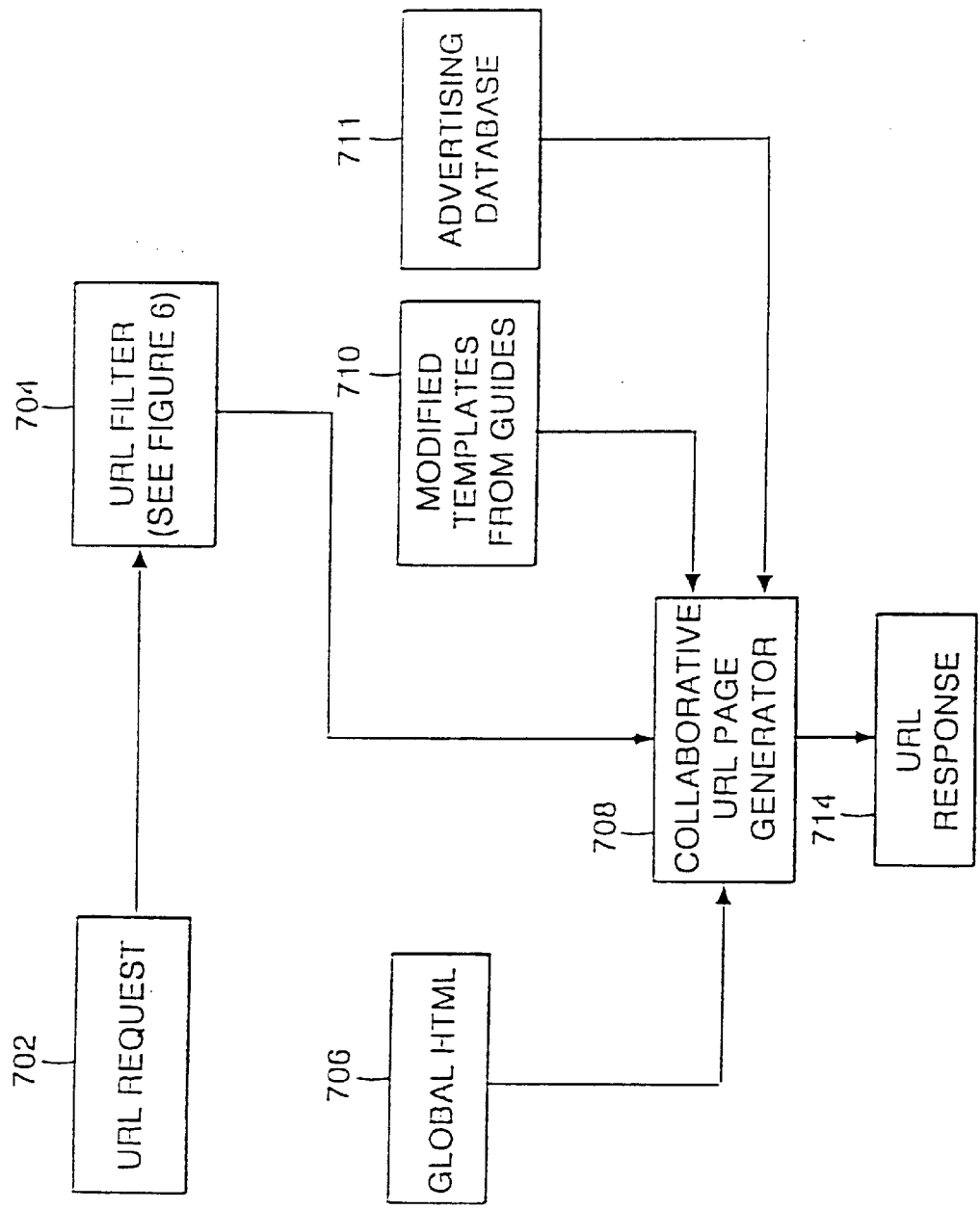
FIG. 8 is a detailed diagram of the collaborative page generator (12) in which the global HTML data (10) and advertising data (16) are brought together to create page content for the frames system (18) and the Internet user at a web browser (20).

The collaborative guide system may then generate a response to the request for the web page (532) as generally shown in FIG. 8 of the present invention. However, the generation program may use the passed argument(s) (528) or the value set in the cookie (524) to generate an appropriate web page and/or taxonomy. Such a web page may display a taxonomy that excludes objectionable or otherwise undesired sites.

The collaborative guide system may generate virtual advertisements (524) with the arguments from either the cookie (524) or the passed argument(s) (528). Furthermore, the collaborative system may generate web pages by using the global information available, see FIG. 8, that contains the logos, trade dress, color scheme and the like to co-brand the page web for the third party identified in the passed parameter or the pre-set cookie. Thus, by using the collaborative techniques described herein, in combination with additional information that identifies the third party, the present invention may create a virtual taxonomy tailored to the needs of the third party.

FIG. 8 may depict the generic structure employed by the features discussed above in FIG. 6A. A URL request may enter the system (702) and pass to the URL filter (704) which in turn may be directed to FIG. 6. The collaborative URL page generator (708) may use the URL filter to generate the URL response generated in part from the modified templates from the guides (710) and the advertising database (711). Finalized guide templates, as discussed above, may pull in information from the global HTML files (706) to generate the URL response (714).

Figure 7:
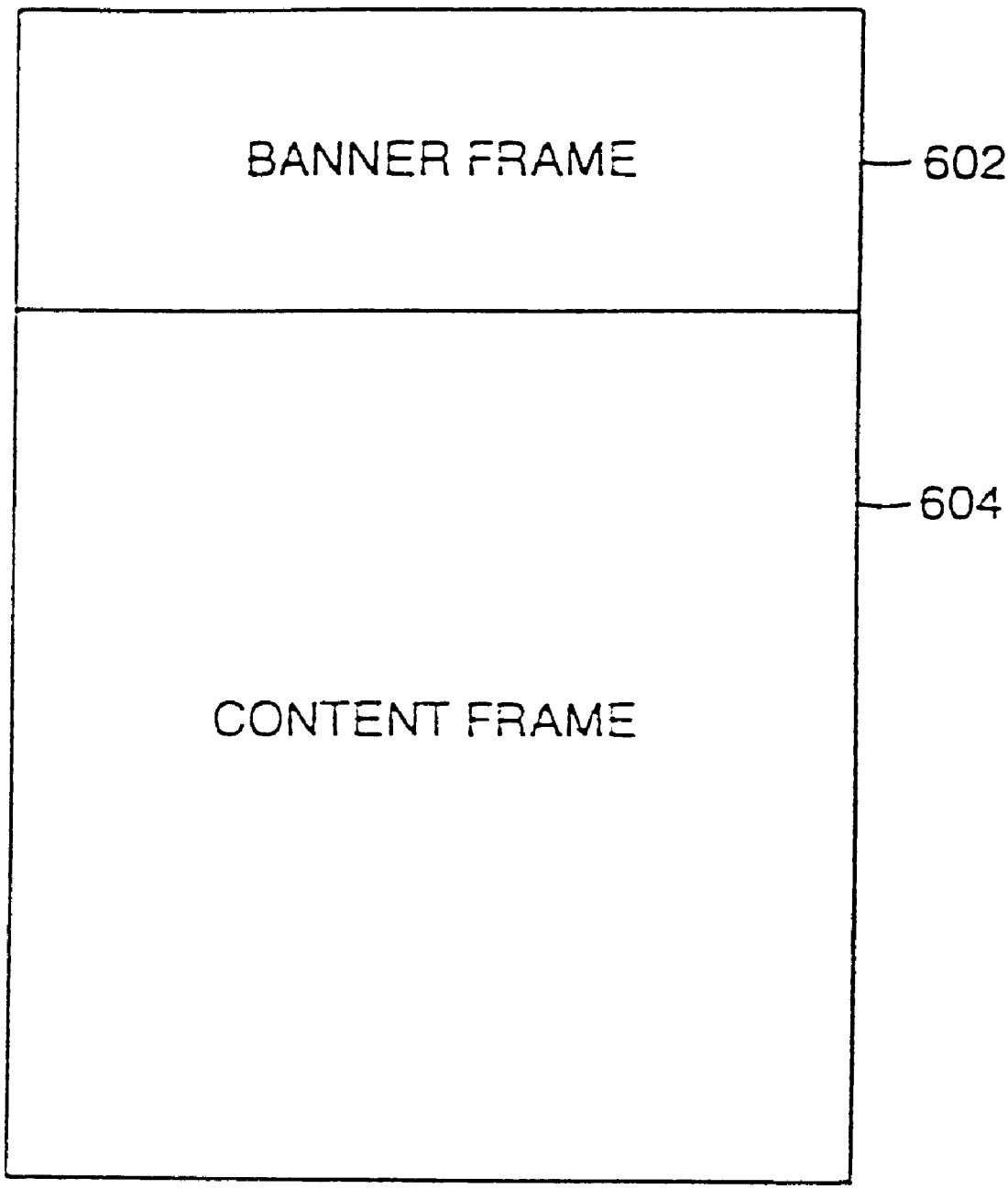
FIG. 7 shows a block diagram of an example of how frame based data may be used.

FIG. 7 may depict a very simple frame based data format. The banner frame is shown (602) above the content frame (604). In the typical application, the banner frame provides the branded look and feel to the web site and the content frame (604) provides the topical content.

Thus, the present invention provides a means for creating, managing, maintaining and automating a collaborative data mining system. This disclosure provides an exemplary disclosure of this system and other ways to implement and/or modify the execution of the present invention are within both the spirit and scope of this disclosure.

Therefore, we claim:

1. An apparatus for the generation of HTML web pages with a predetermined brand name or stylistic attribute comprising:

a storage device;

a computer operationally connected to said storage device;

a HTML web page generator executing on said computer, said HTML web page generator accessing a first file system that contains HTML template files and a second file system that contains files containing a plurality of brand names or stylistic attributes, said HTML web page generator responding to URL requests with a HTML web page that contains information from the first file system and the second file system by selecting at least one brand name or stylistic attribute from said second file system is response to a parameter from a participant's web browser.

2. The apparatus of claim 1 further comprising:

a third file system on said data storage device;

said third file system containing Internet advertisements for insertion into said generated HTML web pages, said HTML web page generator selecting Internet advertisements from said third file system in response to said predetermined parameter from said participant's web browser.

3. The apparatus of claim 2 in which said selection of said internet advertisements is consonant with said brand name selected by said HTML web page generator.

4. The apparatus of claim 3 in which said consonant advertisement selection excludes advertisement from competitors of the brand name.

5. The apparatus of claim 1 in which said stylistic attribute is a set of colors for display on said generated HTML web page.

6. The apparatus of claim 1 in which said stylistic attribute is a set of text fonts for use with said generated web page.

7. The apparatus of claim 1 in which said HTML web page generator responds to a URL request with a HTML web page that contains hyper-text links to URL's that obtain information from said first file system, said HTML web page generator system selecting hyper-text links in response to said predetermined parameter from said participants web browser.

8. A method of providing guide-sponsored content to users over the Internet comprising the steps of:

receiving content and identification information from a plurality of guides, each guide providing content relating to a particular topic for which that guide is approved by a host site;

outputting a web page comprising a directory of topics for which guides have provided content over the Internet to a user;

receiving the selection of a topic from a user over the Internet; and outputting a second web page containing content received from at least one guide about that selected topic and information about that at least one guide.

9. The method of claim 8 wherein the second web page comprises a link to a third web page containing additional information about the guide.

10. The method of claim 9 wherein the third web page comprises an electronic address where the user may communicate with the guide.

11. The method of claim 2 further comprising the step of receiving a communication at the guide's electronic mail address from a user.

12. The method of claim 11 further comprising the step of transmitting a response to the communication from the guide's electronic mail address to the user.

13. The method of claim 8 further comprising the step of providing a forum for discussion relating to the topic.

14. The method of claim 13 further comprising the step of monitoring the forum by a guide for that topic and providing content from the guide on the forum.

15. The method of claim 8 wherein the information about the guide comprises the guide's name.

16. The method of claim 8 wherein the information about the guide comprises a photograph of the guide.

17. The method of claim 8 wherein the information about the guide comprises an electronic address where the user may communicate with the guide.

18. The method of claim 8 further comprising the step of presenting a web page with the guide's electronic mail address.

19. The method of claim 8 further comprising the step of enabling users to participate in an on-line chat relating to the topic with the guide.

20. The method of claim 8 wherein the content provided by the guide comprise one or more links to content available at other web sites on the Internet.

21. The method of claim 8 wherein the guides search the Internet for content to be included in the content provided to the host site for the topic.

22. The method of claim 8 wherein the directory is organized into interest areas, each interest area comprising a plurality of topics.

23. The method of claim 8 further comprising the step of outputting a newsletter generated by the guide to users that request additional information about the topic.

24. A method of retrieving guide-sponsored content over the Internet from a host site comprising the steps of:

accessing a web site over the Internet, wherein the web site provides a web page comprising a directory of topics for which guides have provided content, each guide having provided content relating to a particular topic for which that guide is approved by a host site;

conveying a topic selection by the user over the Internet to the web site; and receiving a guide-sponsored web page containing content provided by the guide to the host site and information about the guide.

25. The method of claim 24 wherein the guide-sponsored web page comprises a link to a third web page containing additional information about the guide.

26. The method of claim 25 wherein the third web page comprises an electronic address where the user may communicate with the guide.

27. The method of claim 24 wherein the information about the guide comprises the guide's name.

28. The method of claim 24 wherein the information about the guide comprises a photograph of the guide.

29. The method of claim 24 wherein the information about the guide comprises an electronic address where the user may communicate with the guide.

30. The method of claim 24 further comprising the step of communicating with a guide using an address presented about the guide.

31. The method of claim 24 further comprising engaging in a forum monitored by the guide relating to the topic.

32. The method of claim 24 further comprising the step of chatting with the guide relating to the topic.

33. The method of claim 24 wherein the directory is organized into interest areas, each interest area comprising a plurality of topics.

34. A system for providing guide-sponsored content to users over the Internet comprising:
   guide interface means for receiving content and identification information from a plurality of guides, each guide providing content relating to a particular topic for which that guide is approved by a host site;
   directory display means for outputting a web page comprising a directory of topics for which guides have provided content from the host site over the Internet to a user;
   selection receiving means for receiving the selection of a topic from a user over the Internet; and
   guide content output means for outputting a web page containing content received from at least one guide for that topic and information about that at least one guide.

35. The system of claim 34 wherein the information about the guide comprises an electronic address where the user may communicate with the guide.

36. The system of claim 35 further comprising electronic mail communication means for enabling a guide to communicate with a user that sends communications to the guide at the electronic address supplied for that guide.

37. The system of claim 34 wherein the information about the guide comprises the guide's name.

38. The system of claim 34 wherein the guide content output means presents one or more additional web pages comprising information about the at least one guide.

39. The system of claim 34 wherein the information about the guide comprises a photograph of the guide.

40. The system of claim 34 further comprising forum means for providing a forum where users and the guide may post information.

41. The system of claim 34 further comprising chat means for enabling the user and the guide to chat.

42. The system of claim 34 wherein the directory is organized into interest areas, each interest area comprising a plurality of topics.

43. A system for selectively generating web pages with a predetermined brand name or style comprising:
   a storage device;
   a computer processor that executes a program from said storage device in which the computer under said program control generates a HTML web page in response to a URL request from an Internet participant, said computer providing a predetermined parameter to said participant in response to a URL request to a predetermined Internet address and redirecting said request to said predetermined Internet address to a second URL, said redirected URL containing a predetermined parameter, said computer receiving said redirected URL request and detecting said predetermined parameter in said redirected URL request, said computer generating a HTML web page in response to said detected predetermined parameter, said computer selecting from a predetermined set of brand name or web page styles identified by said detected predetermined parameter to generate a HTML web page response with said predetermined brand name or web page style.

44. The system of claim 43 further comprising:
   said computer executing under said program control receiving a second URL request from said participant, said computer determining whether said second URL request from said participant follows the first URL request from said participant by detecting said predetermined parameter provided to said participant in response to the first URL request, said computer generating a predetermined brand name or web page style if said predetermined parameter is detected.

45. The system of claim 43 further comprising:
   said computer executing under said program control blocking predetermined Internet advertisements from insertion in said generated HTML web pages in response to the predetermined parameter.

46. The system of claim 43 further comprising:
   said computer executing under said program control passing data to an Internet advertisement generator system in response to said predetermined parameter;
   said data modify the selection of Internet advertisements in said Internet advertisement generator system.

47. The system of claim 43 further comprising:
   said computer executing under said program control generating predetermined hyper-text links in said generated HTML web pages in response to said predetermined parameter.

48. The system of claim 47, in which said generations of said predetermined hyper-text links for said HTML web pages is consonant with said generated brand name.

49. A method for selectively generating web pages with a predetermined brand name or style comprising:
   receiving a URL request from an internet participant at a predetermined internet address;
   outputting data to said internet participant, said data identifying a predetermined parameter for selective subsequent generation of web pages;
   redirecting said URL request to a second predetermined internet address, said redirected URL request passing a predetermined parameter for the subsequent selective generation of web pages; and
   generating a web page with a predetermined brand name or style in response to said redirected URL request and said predetermined parameter passed in said redirected URL request.

50. The method of claim 49 further comprising:
   generating said web page with a predetermined brand or style in response to said redirected URL request and said predetermined parameter passed in said redirected URL request by combining a first HTML file with a data file wherein said predetermined parameter passed in said redirected URL request selects data from said data file to form a web page response that contains a particular brand or predetermined style.

51. The method of claim 49 further comprising:

receiving a second URL request from said internet participant;

detecting said predetermined parameter from said step of outputting data to said internet participant; and generating a second web page response with a predetermined brand or style in response to said predetermined parameter from said step of detecting.

52. The method of claim 49 wherein:

said step of generating a second web page combines data from a data file that contains global style data and brand name logos with an HTML file that contains information specific to said second URL request.

53. A method of providing guide generated content to users over the Internet comprising the steps of:

outputting a listing of guide-sponsored sites organized by subject matter over the Internet to a user, each guide site comprising content about a particular subject matter in the listing;

receiving over the Internet a selection of one of the guide sites output in the listing from an Internet user; and outputting at least one web page corresponding to the selected guide site, the web page comprising content generated by a human guide for the subject for which the guide is listed and identification information about the human guide that provided the content.

54. The method of claim 53 wherein the identification information comprises a photograph and the guide's name.

* * * * *